(12) United States Patent
Towata

(10) Patent No.: US 9,772,893 B2
(45) Date of Patent: Sep. 26, 2017

(54) NETWORK DEVICE AND METHOD OF SPECIFYING SUPERVISED DATA TO BE TRANSMITTED TO SYSTEM IN ACCORDANCE WITH CALCULATION LOGIC USED FOR CALCULATING PREVIOUS TIMINGS OF DATA STORED IN A SENSOR DATA DATABASE

(71) Applicant: CANON KABUSHIKI KAISHA, Tokyo (JP)

(72) Inventor: Hiroaki Towata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 14/585,275

(22) Filed: Dec. 30, 2014

(65) Prior Publication Data

US 2015/0205658 A1    Jul. 23, 2015

(30) Foreign Application Priority Data

Jan. 20, 2014  (JP) ................. 2014-008076

(51) Int. Cl.
| | | |
|---|---|---|
| *G06F 11/07* | (2006.01) | |
| *G06F 11/14* | (2006.01) | |
| *G06F 11/30* | (2006.01) | |
| *G06F 3/12* | (2006.01) | |

(52) U.S. Cl.
CPC ...... *G06F 11/0766* (2013.01); *G06F 11/0733* (2013.01); *G06F 11/0748* (2013.01); *G06F 11/1446* (2013.01); *G06F 11/30* (2013.01); *G06F 11/3089* (2013.01); *G06F 3/121* (2013.01); *G06F 3/1229* (2013.01); *G06F 3/1285* (2013.01)

(58) Field of Classification Search
CPC ............ G06F 11/0766; G06F 11/0733; G06F 11/0748; G06F 11/30; G06F 3/121; G06F 3/1229; G06F 3/1285; G06F 11/1446; G06F 11/3089; G06F 2201/84
See application file for complete search history.

(56) References Cited

U.S. PATENT DOCUMENTS

| | | | |
|---|---|---|---|
| 5,400,018 A * | 3/1995 | Scholl ...................... | G08G 1/20 340/10.3 |
| 5,800,081 A | 9/1998 | Teradaira et al. | |
| 6,082,910 A | 7/2000 | Teradaira et al. | |
| 6,256,594 B1 * | 7/2001 | Yamamoto ............. | G07C 5/008 701/30.4 |
| 7,644,302 B2 * | 1/2010 | Kambara ............ | G06F 11/2025 714/6.11 |
| 7,725,775 B2 * | 5/2010 | Tsuzuki ................ | G06F 3/1207 714/4.1 |
| 8,122,296 B2 * | 2/2012 | Kato .................... | G06F 11/0733 399/10 |
| 9,547,946 B2 * | 1/2017 | Zhang .................. | G05B 19/042 |

(Continued)

FOREIGN PATENT DOCUMENTS

| | | | | |
|---|---|---|---|---|
| CN | WO 2014000275 A1 * | 1/2014 | ........... | G05B 19/042 |
| JP | 07-137358 A | 5/1995 | | |

*Primary Examiner* — Matt Kim
*Assistant Examiner* — Paul Contino
(74) *Attorney, Agent, or Firm* — Fitzpatrick, Cella, Harper & Scinto

(57) ABSTRACT

A device specifies status data that should be uploaded to a management system using condition data and calculation logic, and uploads only status data that should be uploaded.

8 Claims, 22 Drawing Sheets

(56) References Cited

U.S. PATENT DOCUMENTS

| | | | | |
|---|---|---|---|---|
| 2003/0105995 A1* | 6/2003 | Schroath | ............... | G06K 15/00 |
| | | | | 714/48 |
| 2005/0038827 A1* | 2/2005 | Hooks | ................. | G06F 11/0748 |
| 2007/0293232 A1* | 12/2007 | Nonaka | ................. | H04W 24/00 |
| | | | | 455/450 |
| 2010/0198967 A1* | 8/2010 | Takahashi | .......... | H04N 1/00344 |
| | | | | 709/224 |
| 2012/0159267 A1* | 6/2012 | Gyorffy | ............. | G06F 11/0709 |
| | | | | 714/55 |
| 2013/0332930 A1 | 12/2013 | Towata | | |

\* cited by examiner

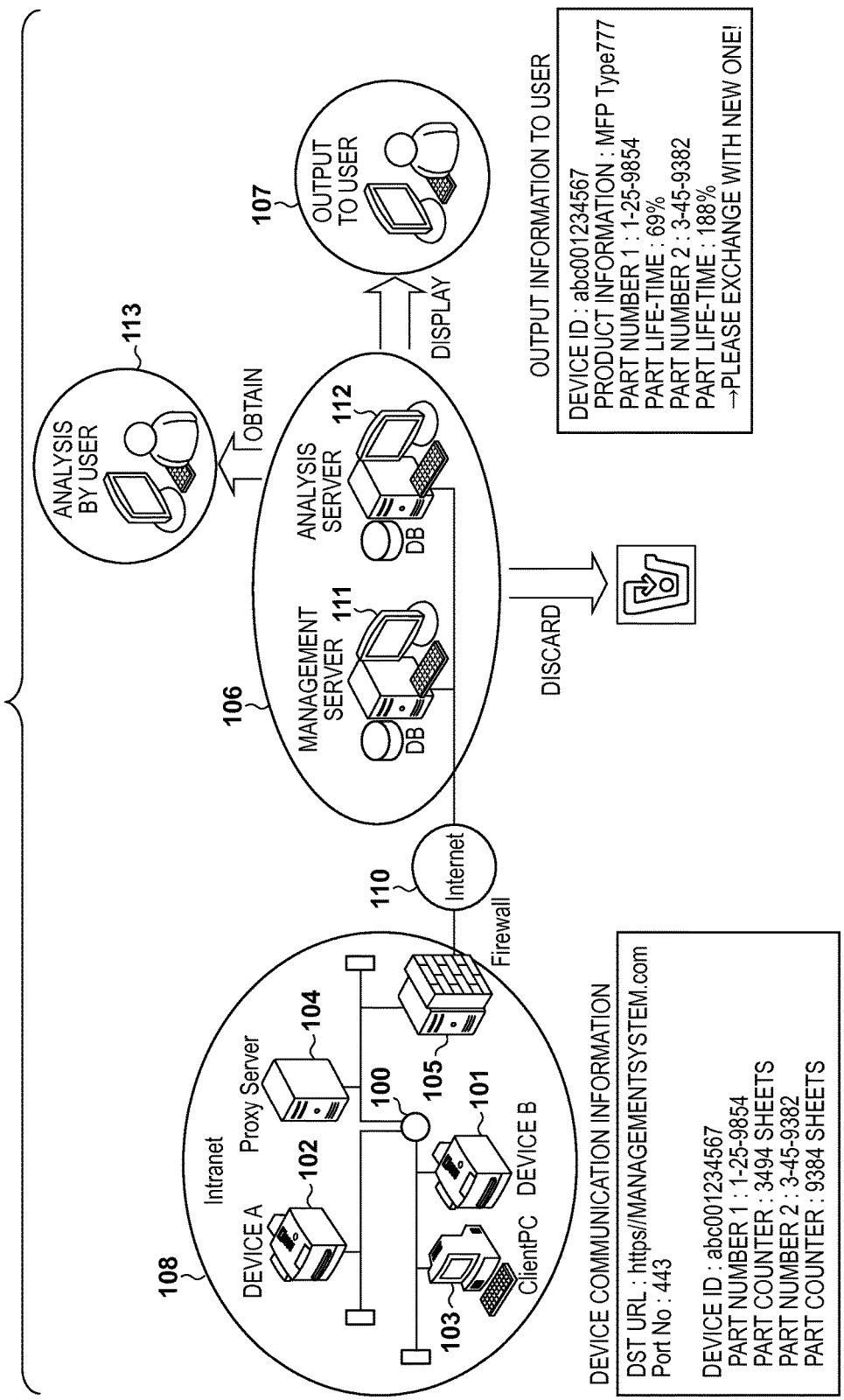

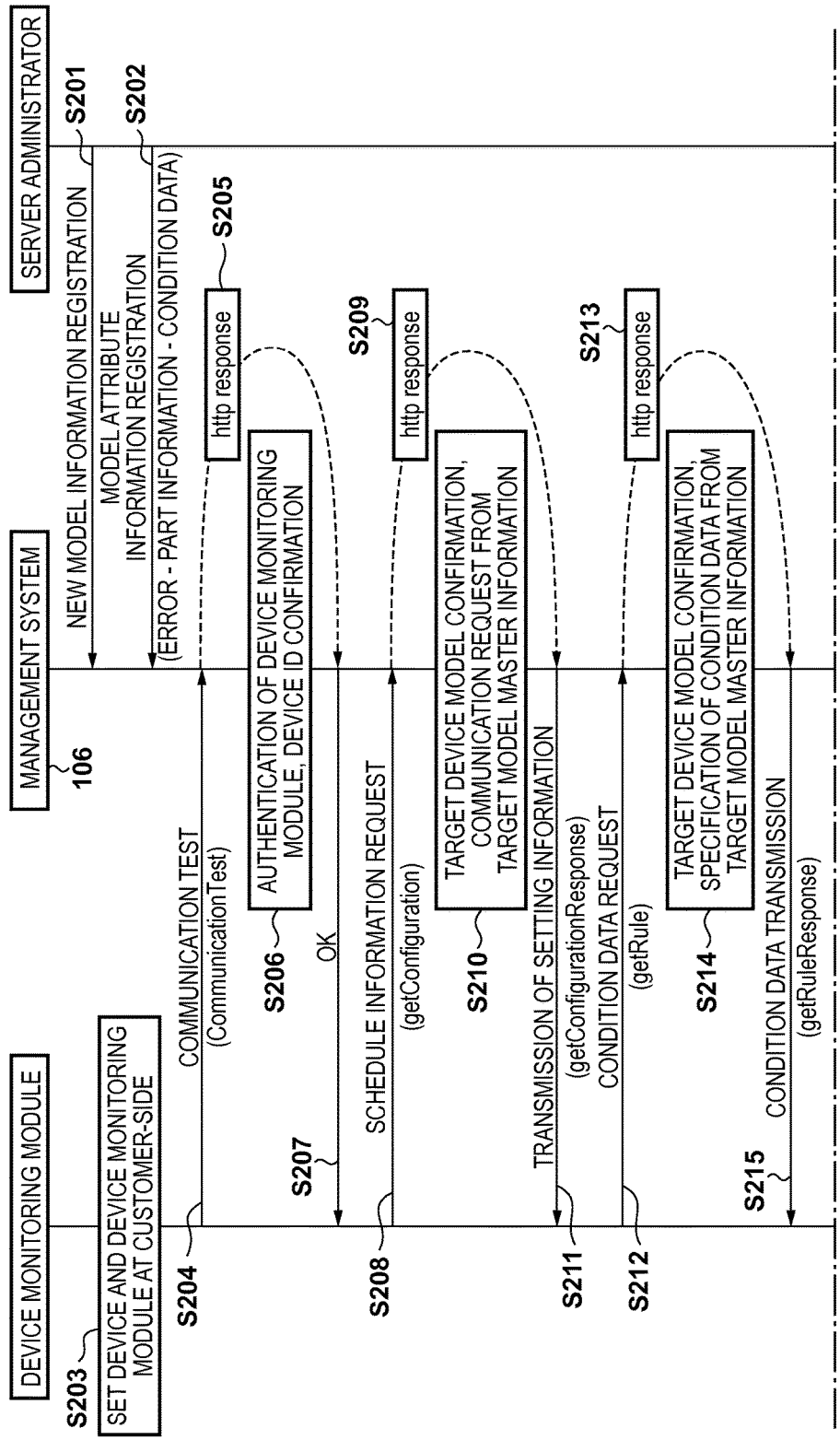

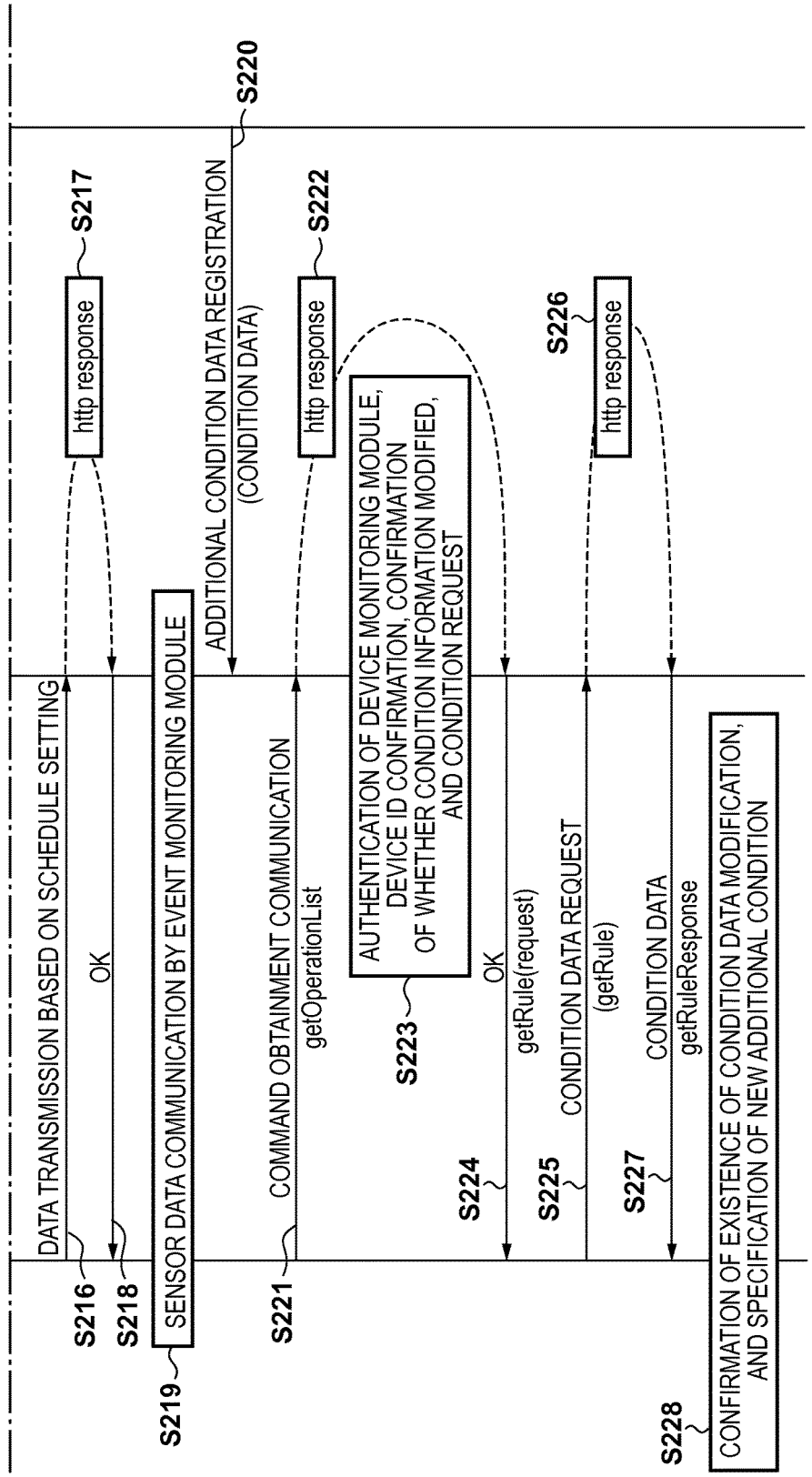

| | |
|---|---|
| SYSTEM BASE PROGRAM (OS) | 501 |
| DEVICE MANAGEMENT PROGRAM | 502 |
| USER INTERFACE PROGRAM (MASTER DATA INPUT PROCESSING) | 503 |
| USER/MANAGEMENT DEVICE AUTHENTICATION PROGRAM | 504 |
| MESSAGE TRANSMISSION/RECEPTION PROGRAM | 505 |
| RECEIVED COMMAND ANALYSIS PROGRAM | 506 |
| EACH PROCESSING PROGRAM | 507 |
|     COMMAND TRANSMISSION PROGRAM | 508 |
|     SCHEDULE SETTING TRANSMISSION PROGRAM | 509 |
|     STATUS RECEPTION PROGRAM | 510 |
|     CONDITION TRANSMISSION PROGRAM | 525 |
|     SENSOR DATA RECEPTION PROGRAM | 526 |
|     ... | |
| ... | |
| MODEL-DEPENDENT DEVICE MASTER DB | 511 |
|     BASIC INFORMATION | 512 |
|     MODEL-DEPENDENT ERROR INFORMATION | 513 |
|     MODEL-DEPENDENT ALARM INFORMATION | 514 |
|     MODEL-DEPENDENT JAM INFORMATION | 515 |
|     MODEL-DEPENDENT PART INFORMATION | 516 |
|     MODEL-DEPENDENT CONDITION DATA | 523 |
|     MODEL-DEPENDENT CALCULATION LOGIC | 524 |
|     ... | |
| MONITORING TARGET DEVICE MASTER DB | 517 |
|     DEVICE ID | 518 |
|     DEVICE MODEL INFORMATION | 519 |
|     MONITORING TARGET ENABLED STATUS | 520 |
|     TRANSMISSION SETTING INFORMATION | 521 |
|     SENSOR DATA | 522 |
|     ... | |

FIG. 7

MANAGEMENT SYSTEM COMMUNICATION SAMPLE 1

| | |
|---|---|
| SETTING REQUEST RESPONSE | ~701 |
|   SCHEDULE SETTING INFORMATION | ~702 |
|     TYPE: EVENT | ~703 |
|     TRANSMISSION TARGET: MODEL-DEPENDENT ERROR CODE | ~704 |
|     TRANSMISSION SETTING: ON | ~705 |
|     ... | |
|     TYPE: EVENT | ~706 |
|     TRANSMISSION TARGET: MODEL-DEPENDENT ALARM CODE | ~707 |
|     TRANSMISSION SETTING: OFF | ~708 |
|     ... | |
|     TYPE: EVENT | ~709 |
|     TRANSMISSION TARGET: MODEL-DEPENDENT JAM CODE | ~710 |
|     TRANSMISSION SETTING: ON | ~711 |
|     ... | |
|     TYPE: EVENT | ~712 |
|     TRANSMISSION TARGET: MODEL-DEPENDENT PART CODE | ~713 |
|     TRANSMISSION SETTING: ON | ~714 |
|     ... | |
|     TYPE: SCHEDULE | ~715 |
|     TRANSMISSION TARGET: PRINT COUNTER DATA | ~716 |
|     TRANSMISSION SETTING: ON | ~717 |
|     TRANSMISSION INITIATION DATE AND TIME | ~718 |
|     TRANSMISSION INTERVAL | ~719 |
|     ... | |
|     TYPE: SCHEDULE | ~720 |
|     TRANSMISSION TARGET: DEVICE SETTING INFORMATION | ~721 |
|     TRANSMISSION SETTING: ON | ~722 |
|     TRANSMISSION INITIATION DATE AND TIME | ~723 |
|     TRANSMISSION INTERVAL | ~724 |
|     ... | |
|     TYPE: SCHEDULE | ~725 |
|     TRANSMISSION TARGET: QUERY FOR COMMAND REQUEST | ~726 |
|     TRANSMISSION SETTING: ON | ~727 |
|     TRANSMISSION INITIATION DATE AND TIME | ~728 |
|     TRANSMISSION INTERVAL | ~729 |
|     ... | |

F I G. 8

MANAGEMENT SYSTEM COMMUNICATION SAMPLE 2

| COMMAND INFORMATION (RESPONSE TO COMMAND RESULT) | ~801 |
|---|---|
| COMMUNICATION RESULT | ~802 |
| PROCESSING COMPLETION DATE AND TIME | ~803 |
| DETAILED EXPLANATION FOR CASE WHERE THERE IS COMMUNICATION ERROR | ~804 |
| COMMAND CALLED FOR SETTING REQUEST | ~805 |

FIG. 9

MODEL-DEPENDENT DEVICE MASTER DB (ProductA)

| | |
|---|---|
| ProductA - MASTER INFORMATION | 901 |
|   SPECIFICATION INFORMATION | 902 |
|     TONER INFORMATION | 903 |
|       ProductA - Black Toner | 904 |
|       ProductA - Cyan Toner | 905 |
|       ProductA - Magenta Toner | 906 |
|       ProductA - Yellow Toner | 907 |
|     ERROR CODE INFORMATION | 908 |
|       E123 : COMMUNICATION CABLE COMMUNICATION DISCONNECTION | 909 |
|       E222 : ABNORMAL VOLTAGE DETECTION | 910 |
|       ... | |
|     ALARM CODE INFORMATION | 911 |
|       A123 : SCAN NOT CLEAN | 912 |
|       A222 : STAPLER OUTAGE | 913 |
|       ... | |
|     JAM CODE INFORMATION | 914 |
|       J123 : FINISHER JAM | 915 |
|       J222 : PAPER FEED TRAY JAM | 916 |
|       ... | |
|     PART CODE INFORMATION | 917 |
|       P123 : DRUM | 918 |
|       P222 : CHARGE ROLLER | 919 |
|       ... | |
|   CONDITION DATA | 922 |
|   CALCULATION LOGIC | 923 |
| LAST UPDATE DATE AND TIME | 920 |
| Initial DATA CREATION DATE AND TIME | 921 |

F I G. 10

| EVENT ID | CALCULATION LOGIC ID | ABSOLUTE VALUE |
|---|---|---|
| JAM-CODE-001 | absolute_time | 600, 1200, 1800, 3600, 86400 |
| JAM-CODE-001 | print_count | 100, 200, 500, 1000, 5000, 10000 |
| JAM-CODE-001 | revolution_count | 100, 200, 500, 1000 |
| JAM-CODE-002 | absolute_time | 600, 1200, 1800, 3600, 86400 |
| JAM-CODE-002 | print_count | 100, 200, 500, 1000, 5000, 10000 |
| DRUM-ERROR-01 | revolution_count | 100, 200, 500, 1000 |
| DRUM-ERROR-01 | print_count | 1000, 2000, 5000, 10000 |
| DRUM-ERROR-01 | absolute_time | 3600, 86400 |
| DRUM-ERROR-02 | revolution_count | 100, 200, 500, 1000 |
| DRUM-ERROR-02 | print_count | 1000, 2000, 5000, 10000 |
| ... | ... | ... |

FIG. 12

MONITORING TARGET DEVICE MASTER DB (DEVICE A)

| | |
|---|---|
| MONITORING TARGET DEVICE A - MASTER INFORMATION | ~1201 |
|   DEVICE IDENTIFIER | ~1202 |
|   PRODUCT INFORMATION: ProductA | ~1203 |
|   MONITORING TARGET ENABLED FLAG | ~1204 |
|   FIRMWARE INFORMATION | ~1205 |
|   ... | |
|   CUSTOMER INFORMATION | ~1206 |
|     CUSTOMER NAME | ~1207 |
|     NAME OF PERSON IN CHARGE | ~1208 |
|     INSTALLATION LOCATION | ~1209 |
|     ... | |
|   Network INFORMATION | ~1210 |
|     DEVICE NAME | ~1211 |
|     IP Address | ~1212 |
|     MAC Address | ~1213 |
|     ... | |
|   ADMINISTRATOR INFORMATION | ~1214 |
|     NAME OF PERSON IN CHARGE OF MANAGEMENT | ~1215 |
|     MAIL ADDRESS OF PERSON IN CHARGE OF MANAGEMENT | ~1216 |
|     NAME OF PERSON IN CHARGE OF CONSUMABLE PARTS | ~1217 |
|     MAIL ADDRESS OF PERSON IN CHARGE OF CONSUMABLE PARTS | ~1218 |
|     ... | |
| SETTING VALUE UPDATE FLAG | ~1219 |
| LAST UPDATE DATE AND TIME | ~1220 |
| Initial DATA CREATION DATE AND TIME | ~1221 |

FIG. 18

| | |
|---|---|
| 1704, 1705, 1706 | |
| SYSTEM BASE PROGRAM (OS) | 1801 |
| DEVICE MANAGEMENT PROGRAM | 1802 |
| MESSAGE TRANSMISSION/RECEPTION PROGRAM | 1803 |
| RECEIVED COMMAND ANALYSIS PROGRAM | 1804 |
| SCHEDULE ANALYSIS PROGRAM | 1805 |
| EACH PROCESSING PROGRAM | 1806 |
|     EVENT INFORMATION TRANSMISSION | 1807 |
|     SCHEDULE INFORMATION TRANSMISSION | 1808 |
|     COUNTER INFORMATION TRANSMISSION | 1809 |
|     SCHEDULE SETTING MODIFICATION | 1810 |
|     CONDITION DATA MODIFICATION | 1824 |
|     ... | |
| DEVICE ID | 1811 |
| ... | |
| DEVICE STATUS DB | 1812 |
|     DEVICE BASIC INFORMATION | 1813 |
|     ERROR INFORMATION | 1814 |
|     ALARM INFORMATION | 1815 |
|     JAM INFORMATION | 1816 |
|     PART INFORMATION | 1817 |
|     ... | |
| DEVICE COUNTER DATA DB | 1818 |
|     CHARGE COUNTER INFORMATION | 1819 |
|     FUNCTION COUNTER INFORMATION | 1820 |
|     ... | |
| EVENT MONITORING PROGRAM | 1822 |
|     UPLOAD UNIT | 1823 |
|     ... | |
| CENTER DATA DB | 1825 |
|     TEMPERATURE SENSOR INFORMATION | 1826 |
|     VIBRATION SENSOR INFORMATION | 1827 |
|     PRESSURE SENSOR INFORMATION | 1828 |
|     ... | |
| CONDITION DATA DB | 1829 |
| CALCULATION LOGIC DB | 1830 |
|     "absolute_time" LOGIC | 1831 |
|     "print_count" LOGIC | 1832 |
|     "revolution_count" LOGIC | 1833 |
|     ... | |
| PROGRAM LOAD AREA | 1834 |

F I G. 20

| SNAPSHOT DATE AND TIME | T_SENSOR_01 | T_SENSOR_02 | T_SENSOR_03 | V_SENSOR_01 | V_SENSOR_02 | V_SENSOR_03 | P_SENSOR_01 | P_SENSOR_02 |
|---|---|---|---|---|---|---|---|---|
| 2013/10/02 17:20:10 | 32.4 | 24.5 | 72.2 | 10.0 | 25.1 | 15.0 | 98.067 | 79.234 |
| 2013/10/02 17:20:00 | 32.3 | 24.5 | 72.2 | 10.0 | 25.1 | 15.0 | 98.067 | 78.434 |
| 2013/10/02 17:19:50 | 32.3 | 24.5 | 72.4 | 10.0 | 25.1 | 15.0 | 98.067 | 78.224 |
| 2013/10/02 17:19:40 | 32.3 | 24.4 | 72.0 | 10.0 | 25.1 | 15.0 | 90.394 | 79.263 |
| 2013/10/02 17:19:30 | 34.1 | 24.4 | 70.0 | 10.0 | 25.1 | 15.0 | 90.334 | 79.424 |
| 2013/10/02 17:19:20 | 38.4 | 24.4 | 65.2 | 10.0 | 0.00 | 15.0 | 90.363 | 78.113 |
| 2013/10/02 17:19:10 | 41.2 | 24.4 | 64.7 | 10.0 | 0.00 | 15.0 | 90.312 | 77.264 |
| 2013/10/02 17:19:00 | 40.3 | 24.5 | 66.6 | 10.0 | 0.00 | 15.0 | 89.234 | 77.403 |
| 2013/10/02 17:18:50 | 39.4 | 24.4 | 67.4 | 10.0 | 25.1 | 15.0 | 85.332 | 76.224 |
| 2013/10/02 17:18:40 | 38.1 | 24.4 | 65.6 | 10.0 | 25.1 | 15.0 | 89.234 | 76.334 |
| 2013/10/02 17:18:30 | 37.7 | 24.4 | 67.3 | 10.0 | 25.1 | 15.0 | 89.213 | 75.524 |
| ... | ... | ... | ... | ... | ... | ... | ... | ... |

FIG. 21

PLEASE SET CONDITIONS FOR ANALYSIS DATA TO BE ACQUIRED.

CONDITION LIST

PLEASE SET CONDITIONS FOR ANALYSIS DATA TO BE ACQUIRED
AND CLICK THE ACQUIRE BUTTON.

| UNIT: | HOUR ▼ |
|---|---|
| RANGE: | 60 ▼ |
| EVENT: | DRUM MALFUNCTION ▼ |
| MODEL: | AT-4904 ▼ |

[ACQUIRE] [CANCEL]

NETWORK DEVICE AND METHOD OF SPECIFYING SUPERVISED DATA TO BE TRANSMITTED TO SYSTEM IN ACCORDANCE WITH CALCULATION LOGIC USED FOR CALCULATING PREVIOUS TIMINGS OF DATA STORED IN A SENSOR DATA DATABASE

BACKGROUND OF THE INVENTION

Field of the Invention

The present invention relates to a network device, and a method of specifying data, for collecting data required for performing a malfunction analysis and a malfunction prediction from a device connected via a network, for example. In particular, the present invention relates to a network device, and a method of specifying data, for collecting data in order to perform a malfunction prediction efficiently, economizing communication and stored data capacity.

Description of the Related Art

Conventionally, maintenance systems in which a management system is installed on the Internet, and customer devices are managed via networks are known. In such conventional maintenance systems, device management is performed by the management system collecting information such as device statuses transmitted from a device monitoring apparatus, event data such as malfunctions, paper jams, or the like, the number of sheets in printing, or the like, for example. Also, in recent years, by collecting detailed device status data from a device monitoring apparatus, cause analysis and prediction of the occurrence of events such as malfunctions, jams, or the like has been performed. As a specific cause analysis, a data analyst, using table calculation software, a BI (Business Intelligence) tool, or the like, makes visible the causal relationship of device status data and the occurrence of events such as malfunctions, jams, or the like. Also, as prediction, an approach using regression analysis is common. A data analyst generates a malfunction analysis or malfunction prediction regression model based on device statuses, event data, and status data of a device that the management system collects. Malfunction analysis and malfunction prediction models are used for the purpose of application to serviceman maintenance plans, presentation of a warning to a user who is the owner of the device, or the like.

Meanwhile, in order to perform high precision analysis and prediction, it is necessary to generate an analysis model based on various additional information and not just simple status data of the device. In Japanese Patent Laid-Open No. 07-137358, improvement of prediction accuracy for a window time until a device malfunctions is realized by generating a model in accordance with device usage condition data in addition to device status data.

However, in Japanese Patent Laid-Open No. 07-137358, high precision prediction can only be performed with an analysis model in accordance with device status data and usage condition data. For this reason, newly generating an analysis model having a close relationship with, for example, device part information, a time over which the device is continuously turned on, or the like, cannot be performed, and it cannot be said to be highly versatile. Also, there is a problem in that even if configuration is taken so as to make collection of status data from the device to be high density and to be for various types in order to improve versatility, in such a case, it is necessary to accumulate a large amount of status data in the management system and so operation costs of the server increase.

SUMMARY OF THE INVENTION

In view of the conventional problems, the present invention provides a network device and data collection method and a data collection system which enable collection of status data of a device that an analyst requires with high versatility and efficiently.

In order to solve the problems described above, the present invention comprises the following configuration.

A network device that communicates with a system for performing analysis of supervised data collected from the network device, comprises: an obtainment unit configured to obtain condition data, for specifying supervised data that the system collects, from the system, a specification unit configured to specify data transmitted to the system from among data detected by the network device in accordance with logic corresponding to the condition data, and a transmission unit configured to transmit the specified data as the supervised data to the system.

With the present invention, it becomes possible to collect status data of a device for generating a malfunction analysis and a malfunction prediction model efficiently while preserving high versatility.

Further features of the present invention will become apparent from the following description of exemplary embodiments with reference to the attached drawings.

BRIEF DESCRIPTION OF THE DRAWINGS

FIG. 1 is a view for illustrating a relationship of connections via the Internet between a copying machine, a managed device and a management system 106 according to the present embodiment.

FIGS. 2A and 2B are views for showing an example of a sequence of communication between a device monitoring module, the management system 106, and a user according to the present embodiment.

FIG. 5 is a view for illustrating an example configuration of a storage of the management system 106 according to the present embodiment.

FIG. 7 is a view for showing an example of information transmitted from the management system 106 according to the present embodiment to the managed device.

FIG. 8 is a view for showing an example of a request inputted to the managed device via the management system 106 by a user according to the present embodiment.

FIG. 9 is a view for showing a model-dependent device master of the managed device stored by the management system 106 according to the present embodiment.

FIG. 10 is a view for illustrating a configuration diagram of condition data according to the present embodiment.

FIG. 12 is a view for showing a monitoring target device master of the managed device stored by the management system 106 according to the present embodiment.

FIG. 18 is a view for illustrating an example configuration of a storage of a device according to the present embodiment.

FIG. 20 is a view for illustrating a configuration diagram of the sensor data according to the present embodiment.

FIG. 21 is a view for illustrating a web screen provided to an analysis user by the management system 106 according to the present embodiment.

DESCRIPTION OF THE EMBODIMENTS

Figure 3:
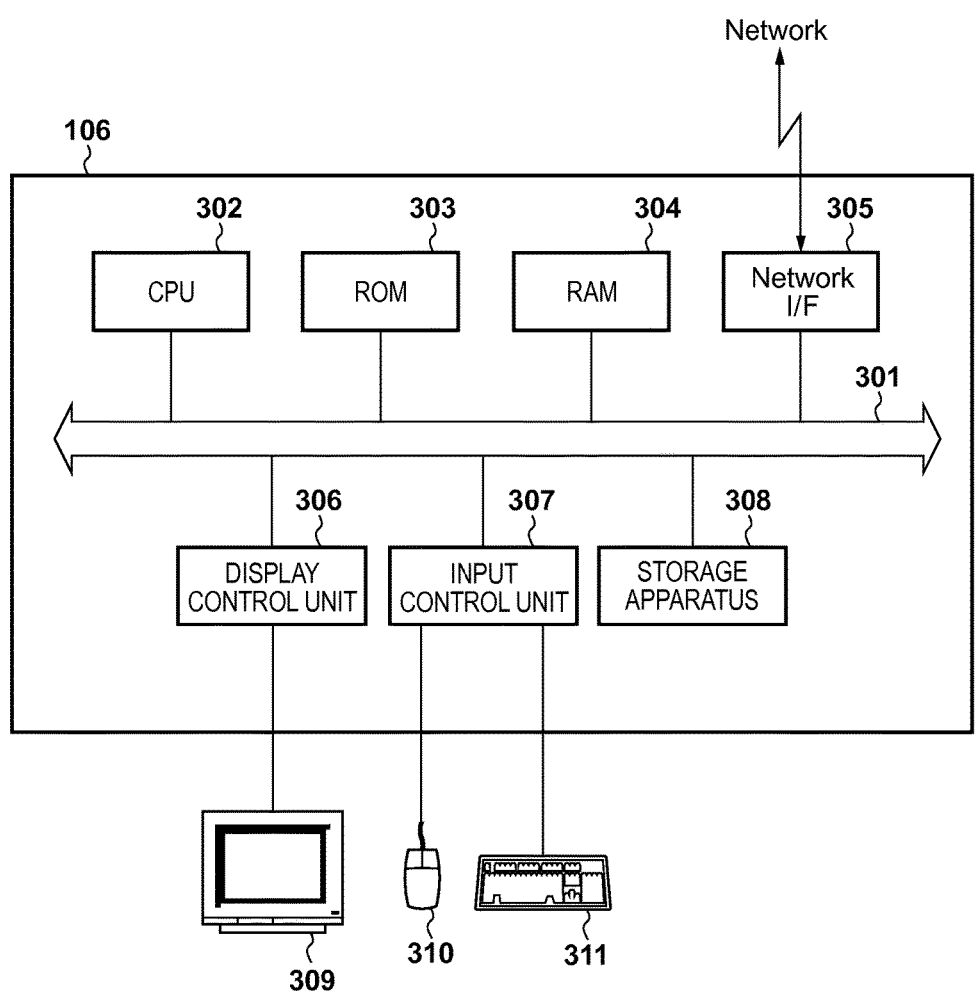
FIG. 3 is a block diagram for showing an example of a hardware configuration of the management system 106 according to the present embodiment.

Below, a configuration for performing the present invention is explained using drawings. Note, in the explanation hereinafter, a communication for notifying of a current status from a device in accordance with a condition that is set is called a schedule type communication. This is a communication for the management system to monitor the newest status of the device. In contrast to this, in a case where an event corresponding to a condition that is set occurs, obtainment of analysis data, mainly explained with reference to FIG. 10, FIG. 11A-FIG. 11C, and FIG. 18 through FIG. 20, is performed to obtain a status of a device at a point in time in the past tracing back from the time of the event, and this is executable independently from schedule type communication. With the obtainment of analysis data, by specifying a causal relationship between the status of the device at a point in time and an event that occurred after that, for example a forenotice of an occurrence of an error can be performed.

<Example Configuration of Device Management System According to the Present Embodiment>

In FIG. 1, an intranet 108 indicates an intranet environment of a customer. In the intranet 108, a firewall 105, functioning as a connection point for restricting access from the Internet or to the Internet, is installed. Also, a proxy server 104 is installed so that one machine can control an HTTP or an HTTPS communication to an external unit.

Network devices 101 and 102 are the devices comprising functions such as printing or copying such as MFPs (Multi Function Printers) or SFPs (Single Function Printers) installed on the customer's network (here, they are referred to as devices). A device monitoring module is embedded in each device, and the module monitors the status of the device and performs communication with an external management system 106. Also, the device monitoring module is a software program for performing device monitoring, so it may exist in a configuration embedded in a device, or in a configuration embedded in a PC or a dedicated piece of hardware. A personal computer 103 represents a personal computer (PC) used for work, or the like, by a general user. Countless networks of other customers similar to the intranet 108 are connected to the Internet 110. Note, in this embodiment, "device monitoring module" is a generic term for a program for monitoring the status of the device and transmitting the status to the management system 106, and for example it comprises processing programs 1806, such as an event information transmission program 1807 defined in FIG. 18. Note, the device monitoring module indicates a module for notifying the management system 106 of a device status in accordance with a particular schedule, and it is different from a program for notifying of a snapshot of a device status in accordance with a condition according to the present application invention. The device monitoring module is not limited to being installed in the device, and also may be realized by a program installed in a computer connected to the same network (more specifically the same LAN) 108 as a monitoring target device. In this case, event information captured by the device is first transmitted to the computer on the same network 108 as a target device, and transmitted to the management system 106 by the device monitoring module being executed in the computer.

The management system 106 comprises a management server 111 and an analysis server 112. The management system 106 is installed on the Internet 110, and collects and manages device information by performing communication with the device monitoring module installed on a customer's network. The device information collected by the management server 111 comprises and operation mode setting of the device, a counter value, an operating log, operating information such as a counter value representing frequency in use of each part, and failure information such as hardware malfunction or jamming. Also, the management server 111 makes an instruction for a command such as one for updating setting information or rebooting to each device. As a communication scheme here, a communication utilizing SOAP via a protocol such as HTTP or HTTPS, or the like, may be used. Also, the device information collected by the analysis server 112 comprises snapshot information of sensor data in the device. Hereinafter, the snapshot information of the sensor data in the device is simply referred to as sensor data. The analysis server 112 provides to the device a condition for sensor data required for analysis from out of the sensor data in the device, and calculation logic for specifying the sensor data compatible with the condition.

It is advantageous for the management system 106 to be comprised of a plurality of server (the management server 111 and the analysis server 112 as exemplified in the present embodiment, or the like) for redundancy or capability improvement. However, it is possible to realize the functions provided by these servers in one server. Also, the communication method is not limited to HTTP or HTTPS, and any communication method by which communication between the management system 106 and the device is possible may be used. For example, in the example of FIG. 1, the device monitoring module obtains the device information of monitoring target, and transmits the data to the management system 106 via the proxy server and the firewall using HTTPS. The management system 106 issues a command to the device monitoring module in order to control the device monitoring module and the device.

Also, the management server 111 provides a function for displaying the device information managed by the management system 106 to a client computer 107 used by a user of the management system. For example, it is possible to confirm if maintenance is necessary or not in the screen of the client computer 107 by displaying life-time information of a part, a remaining amount of a toner, or the like.

Furthermore, the analysis server 112 provides the data to a client computer 113 of an analysis user who analyzes the data (this is called supervised data) managed by the analysis server 112. At this time, for example table calculation software or a BI (Business Intelligence) tool is installed in the client computer 113 by the analysis user, and it is possible to perform data analysis such as a malfunction analysis or a malfunction prediction with the data managed by the analysis server 112. Also, for example, in a web screen provided by the analysis server 112, as shown in FIG. 21, the user inputs a condition for data required for analysis into the analysis server 112, the condition is provided to the network device of monitoring target from the analysis server 112, and data matching the condition from the device can be obtained. Condition data, which is explained with reference to FIGS. 2A and 2B, is inputted in this way.

The management server 111 and the analysis server 112 in the management system 106 can be operated in the same server. For this reason, in the present embodiment, the system including the management server 111 and the analysis server 112 is described as the management system 106.

<Example Configuration of Management System 106 According to the Present Embodiment>

FIG. 3 is a block diagram for showing an example of a hardware configuration of the management system 106 in FIG. 1. The management system 106 may be comprised in a general purpose computer, or the like. The management system 106 comprises a CPU 302 for controlling overall, a ROM 303 functioning as a read-only memory for storing a boot program required for a system activation, and a RAM 304 functioning as a work memory required upon execution of a program by the CPU 302. Also, the management system 106 comprises a network I/F 305 for performing a communication on a network, and a display control unit 306 for displaying content of communication with the device monitoring module, or the like, on the display device 309. Furthermore, input devices 310 and 311 for converting an input from an operator managing the management system 106 to an input signal, and an input control unit 307 for accepting the input signal are comprised. Furthermore, a storage apparatus 308 such as magnetic disk for storing operating information of each device, sensor data, or the like, sent from a program executed in the CPU 302 or the device monitoring module is included. The blocks 302 to 308 are connected by a bus 301.

The management system 106 is continuously receiving periodic operating information notifications and irregular abnormal state notifications, command requests, and sensor data from the device monitoring module via the Network I/F 305. Also, command input such as setting modifications and operation requests from a user to a device are constantly being received via the input control unit 307. Operating information that is notified of periodically includes various counter values and operation logs, and the management system 106 calculates a regular maintenance fee that is charged every month for a customer that owns a device based on the operating information. Also, output in the form of a report describing how much of a recommended life span for a part that is being used in a device has been used up is performed. The management system 106 successively stores operating information in the storage apparatus 308. On the other hand, an operator determines an amount charged for a customer by referencing stored operation information as appropriate. Also, the management system 106, successively stores sensor data that is delivered from a device in the storage apparatus 308. The operator, who performs analysis of the sensor data, referring to the sensor data as appropriate, conducts investigations into causes of various events that occurred within the device, and performs generation of prediction models.

Information indicating abnormal states of a device that are irregularly notified of, include, in addition to operating information, error/alarm information such as hardware malfunctions that occurred, jams, and the like. When the management system 106 receives this information, it determines processing based on a level of emergency of the information. The received information, represents the a device is in an abnormal state such as in the case of a malfunction of the device, and in a case that the received information is failure information requiring immediate restoration, an electronic mail is transmitted to the operator managing the target device. Further, in addition to successively storing in the storage apparatus 308, by displaying on the display 309, the operator is notified that the device has fallen into an abnormal state. On the other hand, in a case where the received information is of a low emergency level, such as in the case of a jam or an alarm, the information is successively stored in the storage apparatus 208, and processing is performed wherein whether or not it is necessary to transmit an electronic mail, and whether or not it is necessary to display to the display 309 is determined according to the malfunction at the time. The operator determines the status of the device based on the display content on the display 309, and instructs a serviceman to perform malfunction restoration work as necessary. For example, the emergency level may be set in advance for each event, or processing may be determined in accordance with each event. In the case of the latter, processing that is in accordance with the emergency level may be embedded within predetermined processing.

Command requests from the device monitoring module are continuously received at an optional timing. When the management system 106 receives a command request, the storage apparatus 308 within the management system 106 is confirmed, and if a command to be transmitted to the device monitoring module is set, the command is transmitted to the device monitoring module.

<Example Configuration of the Software for the Management System 106 According to the Present Embodiment>

Figure 4:
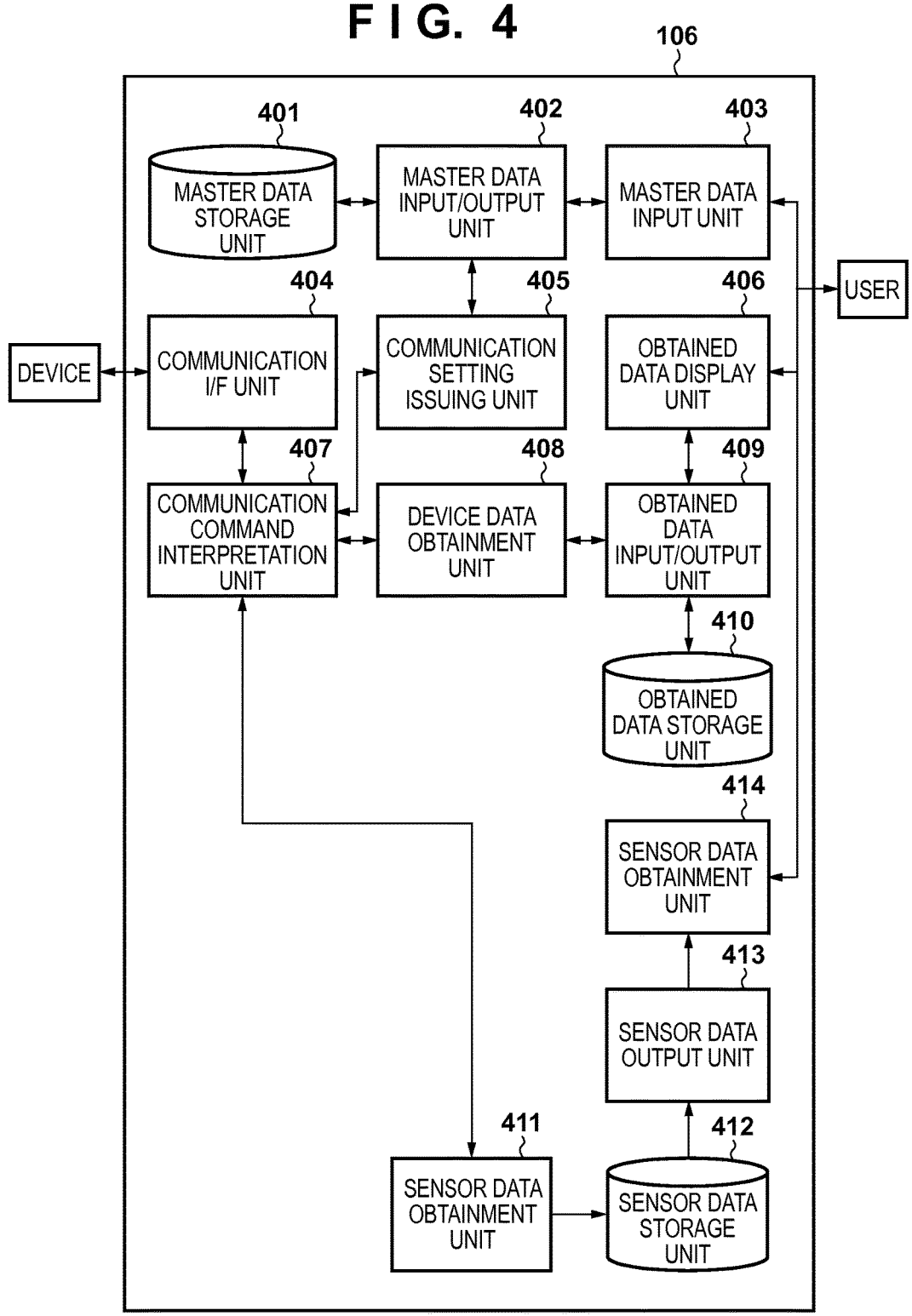
FIG. 4 is a functional block diagram of an application program of the management system 106 according to the present embodiment.

FIG. 4 is a figure for explaining functional modules that are provided by one or more application programs on the management system 106. More specifically, all of the functional modules for the management system 106 may be provided by two application programs that realize each of the functions of the management server 111 and the analysis server 112. Note, the explanation below calls a functional module that is realized by the execution of an application program, or a program portion for a functional module, is called a "unit".

The application program is comprised of a master data input unit 403 for receiving an input of master data from a user. For master data, there exist two types of master data. One is model-dependent device master data which means code information that is dependent upon the device model, such as fundamental model information such as a product name for a device or a product specification, an error, an alarm, or the like. In addition, the model-dependent device master data includes condition data for the device to determine sensor data necessary for analysis. Another type of master data is monitoring target device master data, which means individual information that is a monitoring target, such as customer information, such as a device ID and an installation location for a device, which is a monitoring target.

Also, the application program is comprised of a master data input/output unit 402 that performs processing for storage of input master data into a master data storage unit 401. Also, the application program is comprised of a communication I/F unit 404 that performs communication with the device monitoring module. Also, the application program is comprised of a communication command interpretation unit 407 that retrieves data received from the device monitoring module such as a device ID, a communication command, sensor data and the like as data. The communication command interpretation unit 407 is comprised of a function that forms data for transmission to the device monitoring module in a format for communication. Also, a communication setting issuing unit 405 that issues an appropriate transmission setting to a target device monitoring module when it is necessary for a new transmission setting to be transmitted to the device monitoring module, or when a transmission schedule is requested, is included. This communication setting issuing unit 405 calls model-dependent device master information and monitoring target device master information from the master data input/output unit 402, and issues an appropriate transmission setting for the device monitoring module.

Additionally, the application program has a device data obtainment unit 408 that receives device status data that is received from the device monitoring module in a normal monitoring status from the communication command interpretation unit 407. Also, the application program has an obtained data storage unit 410 for storing device status information that is obtained by the device data obtainment unit 408, and an obtained data input/output unit 409 manages processing for input and output from and to the obtained data storage unit 410. Also, the application program has an obtained data display unit 406 for displaying to user status data that is obtained from a device.

Additionally, the application program has a sensor data obtainment unit 411 that receives sensor data that is received from the device monitoring module during the normal monitoring status from the communication command interpretation unit 407. Also, the application program has a sensor data storage unit 412 for storing sensor data that is obtained from the sensor data obtainment unit 411, and a sensor data output unit 413 manages processing for outputting from the sensor data storage unit 412. Also, a sensor data obtainment unit 414 is included for acquiring sensor data for analysis by a user. The sensor data obtainment unit 414 can obtain, for example, data necessary for analysis from the analysis server 112 on a Web screen as shown in FIG. 21. Note, the sensor data obtainment unit 414 does not need to be a Web screen, and configuration may be taken such that, for example, sensor data that is based on a user command can be returned by specifying the sensor data and acquiring it by an SQL statement, or the like.

Note, it is envisioned that the functional modules shown in FIG. 4 are provided by two application programs that realize each of the functions of the management server and the analysis server. In this case, it is envisioned that, for example, functional modules explained as 401-410 are provided by an application program that realizes the functions of the management server 111.

<Example Configuration of Storage Unit of the Management System 106>

FIG. 5 is a figure showing a memory space for data and programs that are stored in a non-volatile manner in the storage apparatus 308 or the ROM 303 in FIG. 3. Note that FIG. 5 only shows programs or data that are deeply related to the present embodiment, and other items are omitted.

A system program 501, such as an OS or the like, performs basic control of an apparatus. A device management program 502 is a program for controlling all device management for the management system 106. The portions of the present embodiment relating to the corresponding device management program 502 are explained below with reference to FIG. 13, FIG. 14, FIG. 15, FIG. 16, and FIG. 19. A user interface program 503 is a program for controlling display output of a device status to a user, or master data input from a user. The user interface program 503 stores master data inputted from a user to a predetermined database. A user/management device/authentication program 504 is a program for authenticating a user who inputs master data or a device monitoring module that transmits device status data.

A message transmission/reception program 505 controls transmission/reception of messages including commands transmitted/received via the Internet 110 with the device monitoring module. A received command analysis program 506 analyzes a command that is included in a message received from the device monitoring module, and performs instruction to execute a corresponding processing. Each processing program 507 is executed in accordance with an analysis result of the received command analysis program 506. For example, a command request is analyzed, and then a command transmission program 508 is executed. The command transmission program 508 is a program for transmitting a command to the device monitoring module in the case where a command that should be executed on a device is set, as shown in step S223 and step S224 in FIG. 2B. Also, if the result of an analysis of a command received by the received command analysis program 506 is a schedule setting request, a schedule setting transmission program 509 is executed. The schedule setting transmission program 509 is a program for transmitting setting information for a communication schedule as shown in step S210 and step S211 in FIG. 2A. Also, if a device status reception is analyzed, then a status reception program 510 is executed. The status reception program 510 is a program that receives a status data transmission from the device as is shown in step S216 of FIGS. 2A and 2B. Also, if the result of analysis of the reception command by the received command analysis program 506 is determined a condition data request, a condition transmission program 525 is executed. The condition transmission program 525 is a program that transmits condition data to the device as is shown in step S214 and step S215 of FIG. 2B. Also, if the result of analysis of a command received by the received command analysis program 506 is that it is determined to be a sensor data reception, a sensor data reception program 526 is executed. The sensor data reception program 526 is a program for receiving a sensor data transmission from a device in step S1911 in FIG. 19. Here, reception commands related to the present embodiment are shown, but reception commands are not limited to this.

A model-dependent device master DB 511 is a database space representing a model-dependent device master DB for storing in a database of the management system 106. The model-dependent device master DB 511 includes basic information 512 that represents a product name and specification for a device, model-dependent error information 513 that represents model-specific error information, model-dependent alarm information 514 that represents model-specific alarm information, and also model-dependent jam information 515, model-dependent part information 516, model-dependent condition data 523, and a model-dependent calculation logic 524, in the present embodiment.

A monitoring target device master DB 517 is a database space representing a monitoring target device master DB for storing to a database of the management system 106. The monitoring target device master DB 517 includes a device ID 518 that is an identifier for a monitoring target device, device model information 519 that is a monitoring target, and also a monitoring target enabled status 520 that can disable monitoring when registration to a database has been performed, transmission setting information 521 for saving a monitoring target transmission setting, and the like in this embodiment. Additionally, sensor data 522 that records an instantaneous value for a sensor within a device is included.

<Example Configuration of a Memory Space of the RAM 304>

Figure 6:
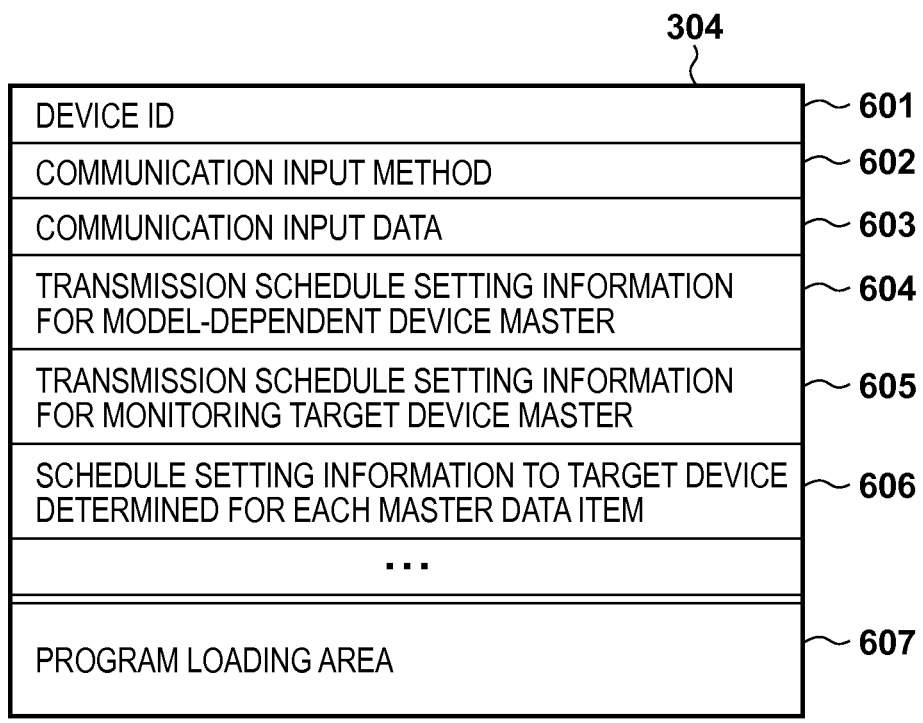
FIG. 6 is a view for illustrating an example configuration of a storage of the management system 106 according to the present embodiment.

FIG. 6 is a figure showing a memory space that is temporarily stored in the RAM 304 in FIG. 3. Note that FIG. 6 only shows programs and data that are deeply related to the present embodiment, and other items are omitted. A device ID 601 is a device ID that is transmitted from the device monitoring module. A communication input method 602 represents an input method for communications transmitted by the device monitoring module. Communication input data 603 represents input data for communication that is transmitted by the device monitoring module. For example, as a method, it means an input of a counter type, and an actual counter number and counter value are stored in an input data unit. Transmission schedule setting information that is for a model-dependent device master that is associated with a target device is output for a transmission schedule setting information for model-dependent device master 604. Transmission schedule setting information for a monitoring target device master information that is associated with a target device is output for a transmission schedule setting for monitoring target device master information 605. Once the application program receives a method for a schedule setting request from the device monitoring module, it refers to the transmission schedule setting information for model-dependent device master 604 and the transmission schedule setting information for monitoring target device master 605, and determines an appropriate transmission schedule setting for the target device monitoring module. Here, the transmission schedule setting that is determined is output to a transmission schedule setting to the target device 606.

A program loading area 607 is a storage region that is loaded when the program shown in FIG. 3 is executed by the CPU 302.

<Overview of Communication Sequence According to Present Embodiment>

FIGS. 2A and 2B are figures showing a part of an example of a communication sequence between the device monitoring module, the management system 106, and the server administrator according to the embodiment. Note that, in FIGS. 2A and 2B show an example of performance of instructions for "new model information registration" for a device in step S201, "model attribute information registration" for a device in step S202, and "additional condition data instruction registration" for a device in step S220, from the server administrator to the management system 106, however, these are general explanations for the communication sequence and in reality limitation is not made to these examples. Also, as was explained for FIG. 1, the device monitoring module that is explained below, corresponds to a program group that includes an event monitoring program 1822 and each processing program 1806. Also, the schedule type communication explained at the beginning of the embodiment corresponds to step S208-step S211 in FIG. 2A and step S216-step S218 in FIG. 2B. The steps for acquiring analysis data correspond to step S212-step S215 and step S219-step S227. Step S201-step S207 are steps for placing a device under management of the management system. Step S201/step S202 represent registration of information of a new model of a device by a server administrator into the management system 106. In step S201, basic information for a new model that is put on the market, such as a device model name, a product specification, a product category or the like is registered. In step S202, error code information and part code information for a model that is a new management target are registered. Additionally, in step S202, model-dependent condition data is registered. Condition data is data that represents a condition for sending, from a device to the management system 106, sensor data for which a value detected by a sensor within the device is recorded. The number of sensors are many, and since, values detected by each sensor are, for example obtained at a predetermined frequency, transmitting the values detected by all of the sensors within the device as is to the management system 106 would constitute a vast data size. For this reason, filtering by condition data is performed. Note, in order to perform maintenance on certain models of devices, a plurality of attribute information items such as error code information, part information, alarm information, jam information, and condition data items are required. Hereinafter, this attribute information will be referred to as model-dependent device master data. The sequence diagram of FIG. 2A shows error information, part information and condition data being registered at step S202, and to perform this registration sequence means to make a new model of device usable on the management system 106. Step S203 represents setting work for starting device management by at the customer-side.

In step S204, a communication test for performing confirmation as to whether or not communication is possible with the management system 106 from the device monitoring module that is installed at the customer-side is performed. The management system 106 that receives this communication test performs authentication based on an ID number for the device monitoring module from the content of the communication data (S206). The management system 106 performs confirmation of the device ID that is the monitoring target in the case that authentication is a success (S206). The device information (includes the device ID) of the device that is the monitoring target is considered to be already registered, and by matching the device ID received in the communication test with the device ID registered in the management system 106, the management system 106 recognizes detailed information of the device. In other words, the confirmation of a device ID here refers to searching the monitoring target device master DB 517 using the device ID received from the device monitoring module, and reading out corresponding detailed information such as device type information and the like, and loading that into the RAM 304. Here, as is in step S205, data for notifying the device monitoring module that the communication test completed without any problems is transmitted as an HTTP response. The completion information for the communication test is shown in step S207. Similarly, step S209, step S213, step S217, step S222, and step S226 also show returning a response message as an HTTP response. Also, since the destination of transmission from the device monitoring module in FIGS. 2A and 2B is limited to the management system 106, explanation concerning the destination of transmission from the device monitoring module will be omitted from the explanation below.

Once the communication test completes without any problems, the device monitoring module transmits a schedule information request at step S208. The schedule information request of step S208 notifies the management system 106 of what kind of schedule data will be transmitted by the device monitoring module in accordance with, and the schedule information request is a message querying the management system 106 as to which event data will be required by the management system 106. At step S210, the management system 106 specifies model information from a device ID for a device (hereinafter is referred to as a target device) that is a transmission source of the schedule information request of step S208, and compares model-dependent device master data with the model for the device that received the request, and determines if the management system 106 can manage it or not. It is assumed that in the present example error information and part information is registered in the model-dependent device master DB 518. Therefore, while error information and part information can be managed or processed, other information that is received may be read and thrown away without being able to be handled. Therefore, the management system 106 transmits the setting information to a device management module of the target device such that charge counter information is transmitted as the base data and error information and part information are transmitted as attribute information.

Step S211 represents transmitting the above described setting information to the device monitoring module as an HTTP response of step S209 to the request of step S208. In step S212, the device monitoring module transmits the condition data request. This represents querying the management system 106 about a condition for transmitting sensor data for which values detected each type of sensor within the device are recorded. In step S214, the management system 106 specifies condition data by specifying the model information from the target device ID. In step S215, the management system 106 returns condition data as the HTTP response of step S213 to the request of step S212. In step S216, step S217, and step S218, the device monitoring module is in a normal management status, which means it is performing normal communication. In this communication, information according to setting information that is specified by step S211 is transmitted. For example, in a case where an error occurs on a monitoring target device, and the device monitoring module detects the error, immediately error information is transmitted to the management system 106.

In step S219, the event monitoring unit 1822 enters a normal monitoring state, which means it is performing normal communication. When an event occurs, the event monitoring unit 1822 transmits snapshots of a past device status that traces back from the point in time the event occurred to the management system in accordance with the condition data. In other words, step S219 is expressed as it is in FIG. 2B for convenience of explanation, but once the condition data is temporarily set for a device, other steps are asynchronously performed. Details concerning this communication will be later explained in FIG. 19.

Step S220 represents additional condition data registration into the management system 106 by the server administrator. Sensor data that is determined not to be necessary for collection when model information is registered in step S201, becomes necessary for later analysis and becomes a target of collection. In this case, in step S220, the server administrator registers additional condition data. For example, there are case in which, when, on a certain model of a device, a fixed number of sheets to be printed is exceeded, jamming will occur frequently, and cause analysis is required for such this. Additional registration of condition data increases the amount of condition data to be transmitted to the target model device by the management system 106. For a target device for which installation was performed prior to adding a condition, sensor data that matches an added condition is not transmitted to the management system 106 Here the management system 106 waits for a command obtainment communication, which is one kind of normal transmission, to be transmitted from the device monitoring module.

Step S221 represents the device monitoring module performing a command obtainment communication towards the management system 106 in accordance with the setting. In step S223 the management system 106 performs authentication of the device monitoring module that performed the command obtainment communication at step S221, and specifies a device ID. Additionally, the existence or absence of a modification of condition information for the target device ID is determined. In the case that there is a modification, at step S224 a response is performed to the device monitoring module such that a condition data request is performed. The response at step S224 is returned as an HTTP response of step S222 to the request of step S221.

Step S225 represents the device monitoring module performing a condition data request towards the management system 106. The management system 106 which receives the request, specifies model information from the target device ID, and specifies condition data based on the model of the device for which the request is received. At step S227, the management system 106 returns the condition data. The response at step S227 is returned as an HTTP response at step S226 to the request of step S225.

At step S228, the device compares the received condition data and a condition data DB 1829, and if there is an additional condition, condition data is added to the condition data DB 1829. Note, that the sensor data matching the added conditions at step S228 is uploaded to the management system 106, by processing by an event monitoring unit 1822 that is executed at a constant interval at step S219. Detailed explanation is given for the processing of step S219 using FIG. 19.

Note, there is no need to perform the sequence from step S220, as long as additional condition settings are not performed. Also, in the case that additional condition settings were performed, step S215-step S219 are executed after step S228.

According to the above processing and message sequence, the management system can collect a device status from the monitoring target device according to the set schedule, for each monitoring target device. Additionally, by setting condition data for each device, in the case that an event occurs for a device, the management system can collect a past device status corresponding to the condition data.

<Example Configuration of Communication Data from Management System 106>

FIG. 7 is a figure showing schematically schedule setting information that is transmitted to the device monitoring module from the management system 106. In FIG. 7, a response 701 is a response corresponding to a schedule information request received by the management system 106. The response 701 is a command that indicates a response corresponding to the schedule information request. The response 701 corresponds to information transmitted at step S211, "setting information transmission" that is a response corresponding to the schedule information request at step S208 in FIG. 2A.

Schedule setting information 702 indicates header information for the schedule setting information, and includes a transmission Off/On setting related to each data type, and information such as a schedule communication interval and the like. That is, the schedule setting information 702 corresponds to the schedule data, that is transmitted to the device monitoring module and set, and that was explained in FIGS. 2A and 2B. The schedule data can include a plurality of triggers that are combined as a logical sum. That is, if the schedule data corresponds to one of a plurality of triggers, it is determined to correspond to a trigger condition. Each of the plurality of trigger conditions includes the trigger condition type (a trigger type). In the present example, a trigger type includes an event type and a schedule type. For an event type, an occurrence of an event becomes a trigger for transmission of device status data (however, if the trigger condition is not satisfied, no transmission is performed). For the schedule type, a trigger is when a predetermined time or interval is reached. Also, if the trigger type is an event type, the trigger condition includes a code that indicates what a transmission target is. By this transmission target code, for example, an event classification, such as error, alarm, and jam, or a type for each classification is indicated. Also, when an event that corresponds to a transmission target code that is set occurs, the device status data, for example, includes a transmission setting that indicates whether or not the occurred event should be transmitted to the management system 106 in the trigger condition. If the transmission setting is ON, then device status data that satisfies the set trigger condition is transmitted to the management system 106, and if the transmission setting is OFF, the device status data that satisfies the set trigger condition is not transmitted to the management system 106. Also, in the case that the trigger type is a schedule type, information indicating device status data for the transmission target, and a transmission setting indicating whether or not to transmit, are included with the schedule to be transmitted. The schedule includes a date and time and transmission interval at a transmission initiation.

A concrete example of FIG. 7 will be explained. For a type 703, information indicating a trigger type or an event type is output. For a code 704, an error code indicating if an event is an error is recorded. Also, for a transmission setting 705, a value of ON for the transmission setting is output. In other words, for the conditions 703, 704, and 705, in a case that an error of an error code that is set occurs on a device that is a monitoring target, an event-based instruction is made immediately, or in other words, upon every event occurrence, to the device monitoring module to perform transmission to the management system 106. For conditions 706, 707, and 708 an instruction is made to not transmit information to the management system 106 even in a case that an alarm for a code that is set occurs for a device that is a monitoring target. For conditions 709, 710, and 711 an instruction is made to perform immediate event-based transmission to the management system 106 in a case that a jam for a code that is set occurs for a device that is a monitoring target. Also, for conditions 712, 713, and 714, in the case that an event occurs that indicates a life span, or the like, for a part that is set for a device that is a monitoring target, an event-based instruction is made to perform transmission to the management system 106 immediately for that event.

Also, information indicating an information transmission setting for the schedule type is output for a type 715, and a data type 716 indicates that the device status data for a transmission target is print count data. Also, an ON value is output as a transmission setting for a transmission setting 717, and a standard transmission initiation date and time is output upon performing a schedule transmission for a transmission initiation date and time 718. A transmission interval 719 outputs an interval time between communications when a schedule transmission is performed. In the conditions 715, 716, 717, 718, and 719, an instruction is made to perform transmission of device status data of a transmission target for a specified transmission interval with the specified transmission initiation date as a first time, wherein the trigger type is the schedule type and the transmission target data is print counter data of the device that is the monitoring target. Conditions 720, 721, 722, 723, and 724 are instructing transmission of setting information of the device that is the monitoring target, at a specified transmission interval with the specified transmission initiation date as the first time. In conditions 725, 726, 727, 728, and 729, the device monitoring module itself makes an instruction so as to perform a command request query of the monitoring server. The transmission initiation date and time and transmission interval at this time are specified similarly to other communications.

In FIG. 8, a response 801 is a response corresponding to the command request received by the management system 106. A command that represents a response to a command request is output as command information 801. The response 801 corresponds to a response that is transmitted at step S224 in FIG. 2B. For a communication result 802, a code that indicates whether a received command request succeeded or failed is output. For a processing completion date and time 803, the date and time that processing completed is output, and for a detailed explanation 804, a detailed explanation for, for example, a reason or the like for reception failure is output. Command information is entered for a command 805. This is output when in the case there is a command that must be given as an instruction to a target managed device.

<Example Configuration of a Model-Dependent Device Master Data DB for the Management System 106>

FIG. 9 is a figure schematically showing a part of a database within the management system 106. This corresponds to the master data storage unit 401 in the block diagram of FIG. 4. Master information 901 shows a part of the model-dependent device master data, and model information related to a product known as Product A is stored. Basic specification data of a product, such as information related to the product specification, for example, class information for a device, how many sheets of paper can be printed, is it a color device, or is it a monochrome device, is stored for specification information 902. Information for toner that is can be used in a target device is stored for toner information 903. In the case that it is a color device, toner product information for each color is stored in items 904, 905, 906 and 907. Here, not only information for the product name but also toner attribute information such as the number of sheets in a recommended life span, and the like, is stored.

Information related to an error code implemented for the Product A product is stored in error code information 908. Specific error codes and an explanation of the error codes/corresponding methods are associated in items 909 and 910. Information related to an alarm code implemented in the Product A product is stored in alarm code information 911. Specific alarm codes and explanation for that alarm code/corresponding methods are associated for items 912 and 913. Information related to a jam code implemented in the Product A product is stored in jam code information 914. In items 915 and 916, information such as specific jam codes, an explanation of the jam code, what location in the product the jam has occurred, or the like, is associated. In part code information 917, 918 and 919, information such as a specific part code, an explanation of the part code, the part product name, a recommended life span, or the like, is associated. For a last update date and time 920, the date and time the model-dependent master was updated is stored. For a data creation date and time 921, the first date and time the model-dependent master was first created is stored. In condition data 922, condition data is stored. Condition data is data that represents a condition upon which the monitoring target device should upload sensor data. Condition data is data that is different for each model, and is managed separately. For example, in the case that a malfunction occurs at a high frequency in a model A, by predominantly collecting sensor data for the model A, malfunction analysis can be performed with high precision. Also, regarding a model B, since jamming occurs with high frequency, collecting sensor data predominantly for only jam events is possible. Condition data includes, as shown in FIG. 10, an event ID 1001 uniquely identifying an event within a device, such as an error, an alert, a jam, or the like, a calculation logic ID 1002 uniquely identifying logic for calculating a target date and time for specifying sensor data that should be uploaded, and an absolute value 1003 that is an input for calculation logic. The absolute value 1003 is a constant for tracing back from a current time according to calculation logic, using a physical time (for example seconds as units), a number of sheets to be printed, and a number of rotations of a drum, or the like, as units. Condition data will be explained in detail later together with an explanation of FIG. 19. Calculation logic for tracing back time is stored in calculation logic 923. With regards to the calculation logic, a more detailed explanation is given with FIG. 11A to FIG. 11C. Also, a snapshot of a saved device status obtained for the traced back time is transmitted to the management system 106.

<Example Configuration of the Monitoring Target Device Master Data DB>

FIG. 12 is a figure schematically showing a part of a database within the management system 106. This corresponds to the master data storage unit 401 in the block diagram of FIG. 4. Master information 1201 shows a part of the monitoring target device master data, and device information related to a device called a monitoring target device A is stored here. A device ID for the monitoring target device A is stored in a device ID 1202. The management system 106 can uniquely determine which device received information is of by using device information that is transmitted from the device monitoring module, and the device ID 1202. In product information 1203, product information for the monitoring target device A is stored. The product information 1203 is associated with the model-dependent device master DB in FIG. 9, and error information and alarm information for the monitoring target device, as well as other attribute information, can be used through this product information. A flag 1204 is a flag that can set to enable or disable for a monitoring target. For example, in a case that a device is wished to be removed from a monitoring target on the device managing system 106 temporarily, setting this flag to OFF removes it from the monitoring target. Firmware information 1205 is a location for storing which version of firmware is implemented on a monitoring target device.

Customer information 1206 stores customer information for a monitoring target device. By storing a customer name, a name of the person in charge and an installation location in customer information 1207, a name of the person in charge 1208, and an installation location 1209 respectively, a system user can be notified immediately of which customer's property a target device is, even in a case that an urgent error occurs on the device.

Network information 1210 stores network information for the monitoring target device. A device name, an IP Address, and a MAC Address for a monitoring target device are stored in each of a device name 1211, an IP Address 1212, and a MAC Address 1213. Administrator information 1214 stores information for a customer management person in charge for a monitoring target device. A mail address and name of the administrator who is managing the device itself on the customer-side is stored in a name of the person in charge of management 1215 and a mail address 1216. Also, a mail address and name of the administrator who is managing consumable parts such as toner or the like for the device on the customer-side is stored in a name of the person in charge of consumable parts 1217 and a mail address 1218.

In a flag 1219 is stored flag information that represents whether or not information, for which a schedule communication should be modified in accordance with a model-dependent device master and a monitoring target device master, is updated. For example, in the case that the monitoring target enabled flag 1204 is modified from "enabled" to "disabled", transmitting data related to the device from the device monitoring module is no longer required. The application program receives this and modifies all transmission settings for all device information to OFF. However, since there may be a case where the monitoring target flag changes from "disabled" to "enabled", only a schedule communication for a command request must be scheduled.

In this way, changing status information for a device causes information required on the management system 106 to change as well. Through this, a schedule modification request to the device monitoring module is performed, and when a request is required, this setting value modification flag is added. Also, the date and time that the monitoring target device master was updated is stored in a date and time 1220. The date and time that the monitoring target device master was created is stored in reference numeral 1121.

<Operation Example of Management System 106 According to Present Embodiment>

Based on the above-described configuration, an operation example of management system 106 according to the present embodiment will be explained. Note that, for the operation example given below, to simplify processing, an explanation is given where the device monitoring module is managed by a monitoring module within the same device. However, in reality, the device monitoring module manages a plurality of devices, and in such a case, for a particular device, independent processing is performed, but a processing procedure for such a case is clear.

In the present operation example, an example is shown in which, in a case where there is some kind of communication from the device monitoring module, the management system 106 recognizes the communication method, and gives instructions for transmission settings such that the information to be transmitted from the device monitoring module is sufficient information for the management system 106.

Figure 13:
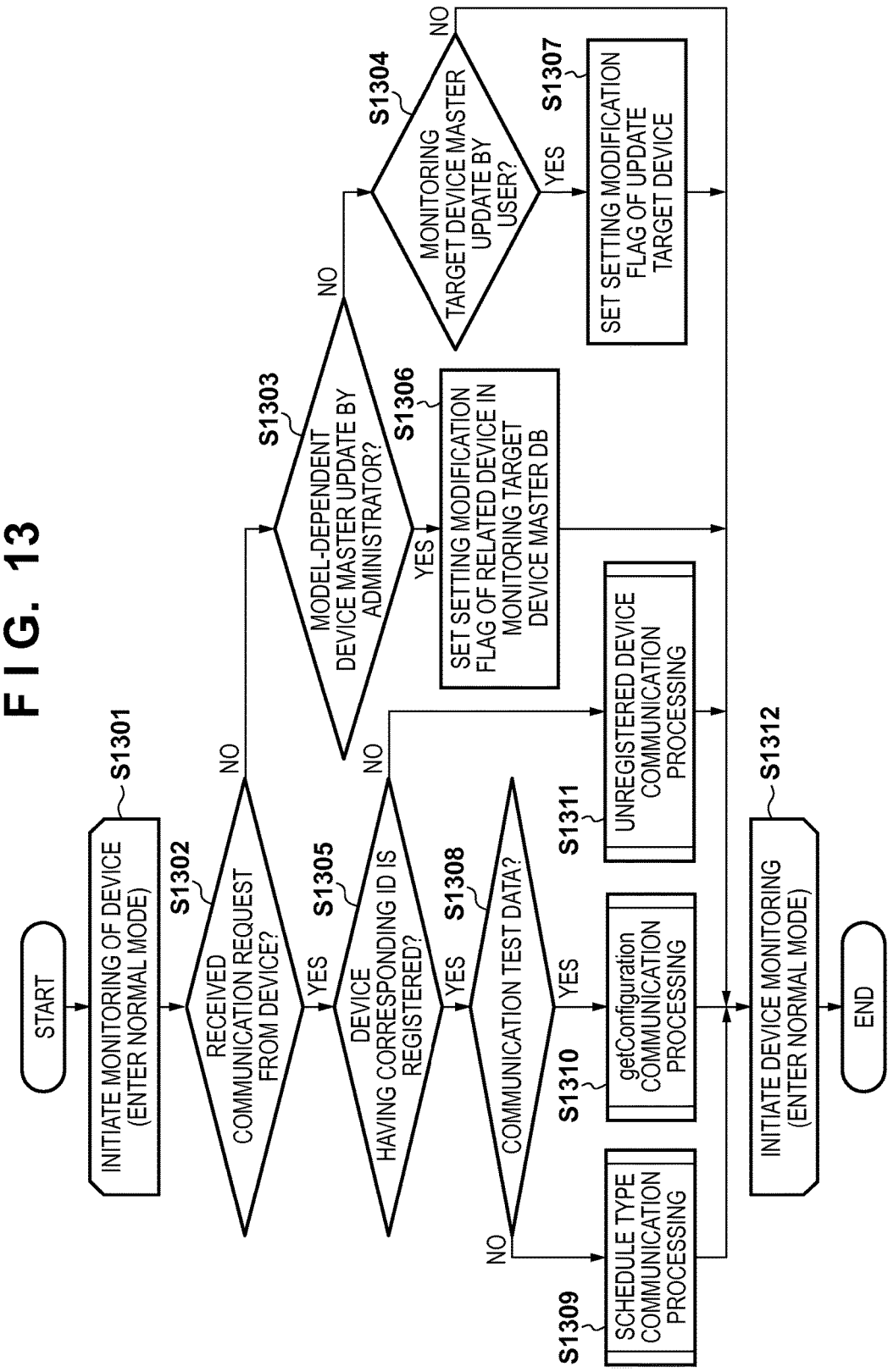
FIG. 13 is a flowchart showing an overall flow when the management system 106 according to the present embodiment returns a setting of a transmission data schedule to the device.

FIG. 13 is a flowchart showing action taken in a case where the management system 106 is in a normal device monitoring mode, and receives a communication request from a device. Also, it is a flowchart showing an action when the management system 106 receives an update of model-dependent device master data from the administrator. Also, it is a flowchart representing actions relating to processing for when a request for a registration of a monitoring target device from a user is received.

The example of operation that is shown in this flowchart is characterized by the management system 106 automatically determining an appropriate communication setting for the device monitoring module based on the setting value for the database within the management system 106, and transmitting setting information. In other words, whether an update of database data is to be performed by the server administrator, or an update of device information is to be performed by the user, the management system 106 is continuously recognizing a communication from the device monitoring module due to communication, and a status of the database. This means that communication information is controlled such that sufficient management is performed without the user being consciousness. Also, in this operation example it is assumed that the device monitoring module is built in to the device, and the management system 106 performs communication with the device.

Step S1301 shows an initiation of a loop that is internal processing of the management system 106. Through this, the management system 106 enters a monitoring mode for the device. Note, step S1301 and step S1312 represent a start and a termination of a loop respectively, and once the processing in FIG. 13 is started, it is repeated until it is suspended. In step S1302, in the case that a communication is received through from a device the Network I/F, the processing proceeds to step S1305, and the management system 106 performs a determination as to whether or not a device ID that is registered within the management system 106 matches the device that is the communication partner. In step S1302, in a case where the management system 106 does not receive a communication from a device, the processing proceeds to step S1303, and determination is performed as to whether updating has occurred by the administrator to the model-dependent device master. At step S1303, in the case that there is an update of the model-dependent master by the administrator, or if there is a determination made as to whether or not there is a registration, and it is found that there is an update to the model-dependent master, the processing proceeds to step 1306, and the management system 106 extracts a device that has a model-dependent master relationship from the monitoring target device master. In the case that there is an update to the model-dependent master, since a related device is influenced by the communication content, the setting modification flag of the target device is set. For example, in the case that alarm information of a model is added, thereafter the management system 106 becomes capable of controlling the alarm information for the target model, and so it is necessary for the communication setting of the device to be updated such that alarm information is transmitted from the device. Here, since the management system 106 cannot update communication settings of the device, it waits for a communication from the device. In order to store this modification in the database, in step 1306, the next time a communication occurs, a setting modification flag is set in order to give an instruction to request to update the communication setting. Once this processing is complete, the processing proceeds to step S1312, and the processing returns to the initial step of the loop that is step S1301. At step S1303, in the case that there is no update of the model-dependent master by the administrator, the process proceeds to step S1304, and confirmation is performed as to whether or not there is an update of the monitoring target device master by a user. The management system 106, at step S1304, determines whether or not there has been an update of the monitoring target device master by a user, and in the case that there has been an update, the processing proceeds to step S1307, and in the case that an update to the database was an update for which a communication setting update is required, the setting modification flag of the update target device is set, and provided in communication from the target device. Also, at step S1304, in the case that there is no update by a user, the processing proceeds to step S1312, and returns to the monitoring mode loop. At step S1307, after the setting modification flag is set, the processing proceeds to step S1312, and returns to the monitoring mode loop.

At step S1305, a determination is made if the device ID transmitted by the communication request is registered in the monitoring target device master DB that is managed by the management system 106. Here, in the case that it is not registered, the processing proceeds to step S1311, and processing for communication is performed for an unregistered device. In device management, normally, a device is installed at the customer after the monitoring target device is registered to the management system 106, and then communication is performed to the management system 106. However, it is not necessarily the case that operation can be performed in this way, and there are cases where a communication from a device is performed prior to a registration for a device being performed. In these kinds of cases, configuration may be taken such that setting processing on the customer side is completed, and management is started at the stage when the registration is performed. In actual processing of the management system 106, the processing described for step S1311 is performed. Also, an explanation of unregistered device communication processing will be performed with FIG. 15.

At step S1305, in the case that the device ID by the device that performed the communication request to the monitoring target device master is registered, the processing proceeds to step S1308, and the management system 106 specifies the communication method and determines whether there is a communication test request. At step S1308, in the case that the performed communication was a communication test method, then the process proceeds to step S1310, and getConfiguration communication processing is performed. This getConfiguration method corresponds to step S208 for FIG. 2A. Also in step S1308, in the case that it can be confirmed that the communication method was not a communication test, then the process proceeds to step S1309 and schedule type communication processing is performed. The getConfiguration communication processing will be explained in the flowchart shown in FIG. 14. Also, with regards to the schedule type communication processing, an explanation will be performed using the flowchart shown in FIG. 16.

Figure 14:
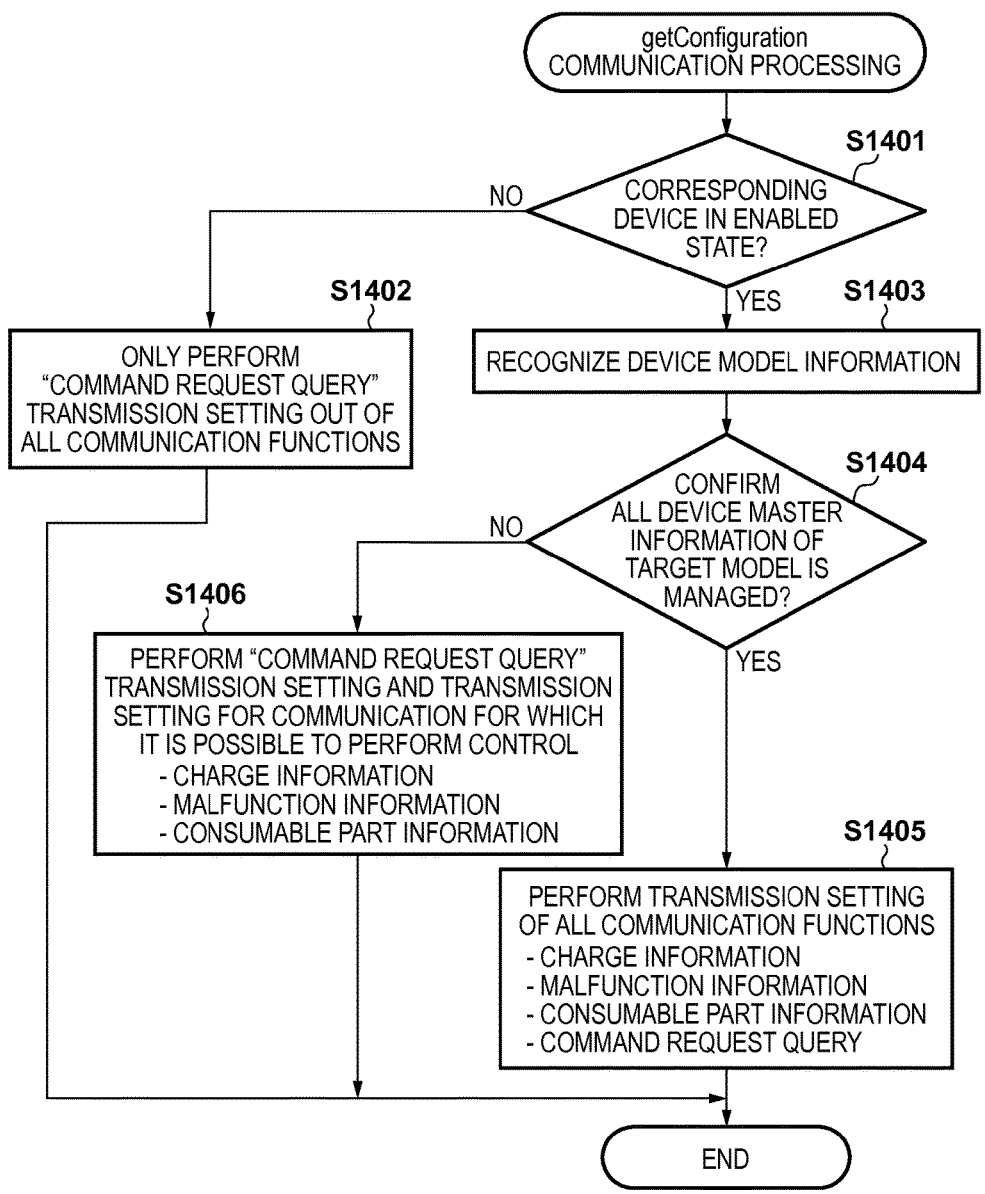
FIG. 14 is a flowchart for showing a flow for when the management system 106 according to the present embodiment receives a schedule request from a device.

FIG. 14 shows detailed processing for the getConfiguration communication processing in step S1310 in FIG. 13. Once the getConfiguration communication processing is initiated, at step S1401, it is determined whether the status of the monitoring target device master is enabled or disabled. In the case that a status of the target device is disabled, the processing proceeds to step S1402, and out of all the communication functions, only the command request query is set, and transmission setting information is transmitted to the target device as a communication response. By doing this, it is possible to keep communication from a device that is not a current management target to a minimum. As a reason for having set the command request query, in the future, if there is a case where the monitoring enabled/disabled flag is enabled, once again, the transmission setting for the target device is modified, and it is necessary to perform control so that necessary data is transmitted. At step S1402, the getConfiguration communication processing ends once the setting is completed. At step S1401, in the case that the corresponding device status is enabled, the processing proceeds to step S1403, and the model-dependent device master is referred to from the model information for the target device. The processing proceeds to step S1404, and in the case that it can be confirmed that all attribute information is already registered on the model-dependent device master, and it can be controlled, then the processing proceeds to step S1405 next. In the case that not all information for the model-dependent device master is prepared, the processing proceeds to step S1406. At step S1405, a communication setting to enable all functions for which the management system 106 can perform management is performed for the device that performed the communication, and transmission setting information is transmitted to the target device as a communication response. At step S1406, a communication type that can be controlled is determined based on attribute information that is registered in the model-dependent device master, and transmission setting information is transmitted as a response to the device that performed the communication request. At each of the steps, the getConfiguration communication processing is finished by returning a transmission setting to the device.

Figure 15:
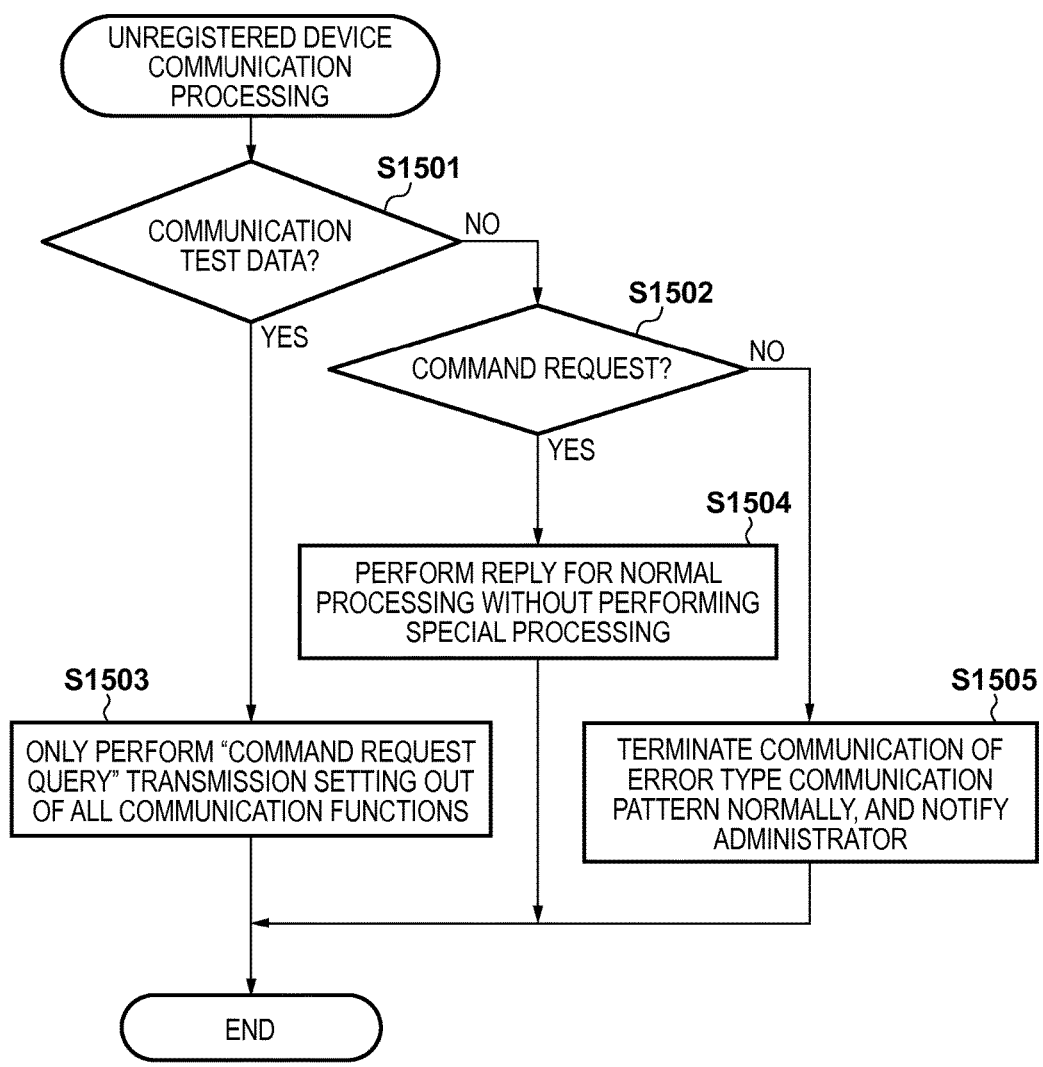
FIG. 15 is a flowchart for showing a flow for when the management system 106 according to the present embodiment receives a communication request from an unregistered device.

FIG. 15 shows detailed processing for unregistered device communication processing in step S1311 in FIG. 13. Once the unregistered device communication processing is initiated, at step S1501, determination is performed as to whether the communication method is a communication test, or if it is something else. In the case that the communication type is a communication test, the processing proceeds to step S1503, and out of all the communication functions, only the command request query communication is enabled, a transmission setting is determined, and the determined transmission setting is transmitted for a communication response. Next, the transmission instruction to the device is finished. Also, at step S1501, if it is found that it is not a communication test, then the process proceeds step S1502. At step S1502, it is determined whether or not the communication type is a command request, or something else. In the case that the communication type is a command request, the processing proceeds to step S1504, and processing is not performed with regards to that communication, and information conveying that the communication has been completed normally is transmitted to the device. Also in the case that is found that the communication type at step S1502 is not a command request, then the processing proceeds to step S1505, and since there is a possibility that a malfunction has occurred in between the system and the device, a notification conveying the situation to the system administrator is performed.

Figure 16:
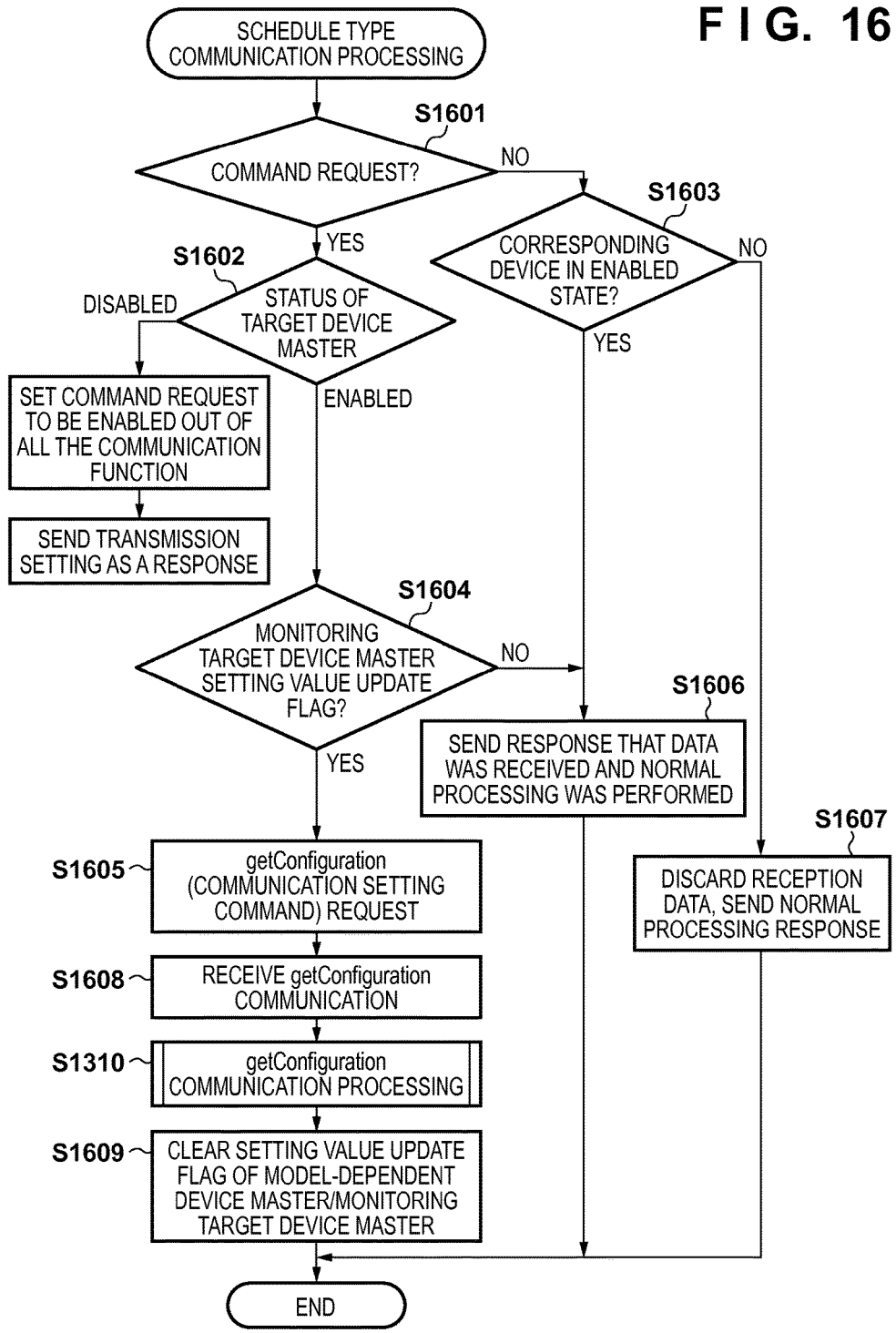
FIG. 16 is a flowchart for showing a flow for when the management system 106 according to the present embodiment receives a device monitoring of from a device.

FIG. 16 shows detailed processing for the schedule type communication processing in step S1309 in FIG. 13. Once the schedule type communication processing is initiated, at step S1601 it is determined if the type of communication is a command request, or if it is something else. According to the determination processing, the processing proceeds to step S1602 in the case that the type of communication is a command request. Also, in the case that it is another type of communication processing, the processing proceeds to step S1603. At step S1602, the enabled/disabled status for the monitoring target device master is determined, and in the case that an enabled status has been set, the processing proceeds to step S1604. At step S1604, the monitoring target device master refers to the setting value update flag. Here, if the update flag has been set, then the processing proceeds to step S1605, and a getConfiguration method request is made towards the communication target device. After this, if a getConfiguration communication request is received at step S1608, the getConfiguration communication processing of step S1310 is performed. Once this processing is complete, at step S1609, the setting value update flag for the target device is cleared for the monitoring target device master.

In step S1604, in a case in which the setting value update flag for the monitoring target device master is not set, the processing proceeds to step S1606, and processing for conveying that communication data has been correctly received and that processing has finished normally is performed. At step S1601, if it is the case that the communication type is not a command request, then the processing proceeds to step S1603, and a determination is made to determine whether the monitoring target device is enabled or disabled. In the case that the corresponding device is in an enabled state, the processing proceeds to step S1606, and a reply is made that the data has been correctly received and that processing has been performed normally. Also, in the case that the device is in a disabled state at step S1603, then the processing proceeds to step S1607, all received data is discarded, and it is replied to the device that communication has finished normally.

At step S1602, in the case that the corresponding device is in a disabled state, then out of all the communication functions, only the command request is set to be enabled, and a transmission setting is transmitted as a response.

By performing the above operations, continuously the management system 106, having managed a device from the management target device, can receive sufficient information, and can perform efficient device monitoring without using network bandwidth and hardware resources pointlessly.

<Example Device Hardware Configuration>

Figure 17:
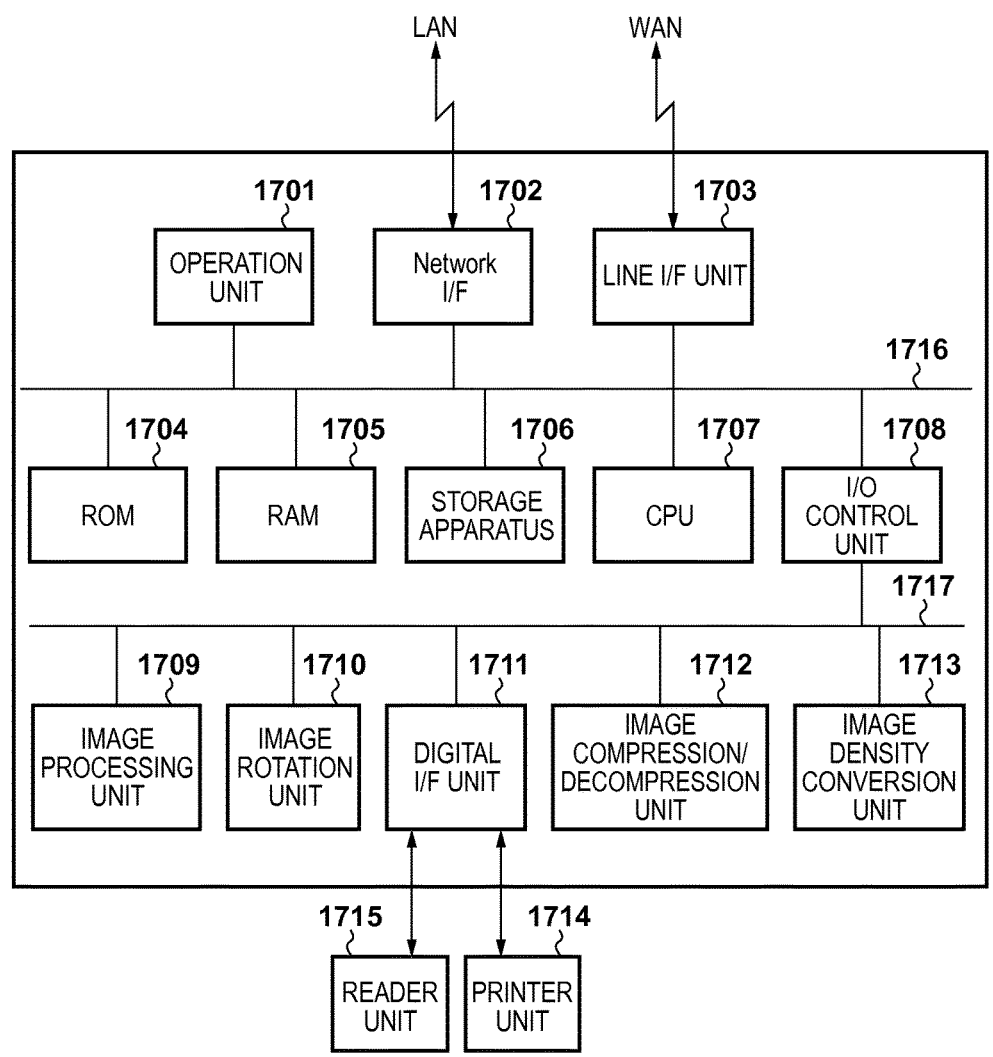
FIG. 17 is a block diagram for showing an example of a hardware configuration of a device according to the present embodiment.

FIG. 17 is a block diagram of a control unit within a device. Here, an example of a device monitoring module performing processing within the device is shown. The device monitoring module is processed within a control unit within the device, and processing such as management of individual information for the device and transmission of status information of the device to the management system 106 is performed. In the control unit of the device, mainly control processing for programs such as those for printing, scanning and the like, is performed, and also each application such as the device monitoring module is controlled. Each of the configuration elements of the control unit are connected to a system bus 1716 and an image bus 1717.

A control program for a device and a device monitoring program are stored in a ROM 1704, and executed by a CPU 1707. A RAM 1705 is a work memory area for executing a program, and is an image memory for temporarily storing status information and image data of required devices where the device monitoring program has performed monitoring. A storage apparatus 1706 is a non-volatile storage apparatus, and various operation mode settings that are required to be stored even after a device is restarted, as well as counter values and operation logs are stored. A Network I/F 1702 is an interface unit for connection to a LAN, and performs communication with the management system 106 through the LAN. A line I/F unit 1703 is connected to an ISDN and a public switched telephone network, is controlled by a communication control program within the ROM 1704, and performs data transmission/reception with a remote terminal through an ISDN I/F, a modem, or an NCU (Network Control Unit). Transmission/reception of a facsimile is also performed using the line I/F unit 1703. A key input unit and a display unit are built into an operation unit 1701, and these are controlled by the CPU 1707. The operator performs various setting instructions related to scanner reading and print output through the key input unit, as well as operate/stop instructions.

The above devices are arranged on the system bus 1716. An I/O control unit 1708 is a bus bridge for connecting the system bus 1716 and the image bus 1717 that transfers image data at high speed. The image bus 1717 is configured as a PCI bus or IEEE 1394. The following devices are arranged on the image bus 1717. A digital I/F unit 1711 connects a reader unit 1715 of a device and a printer unit 1714 with a control unit, and performs conversion between a synchronous system and an asynchronous system for image data. Also, information detected by the previously described various sensors that are arranged within the reader unit 1715, the printer unit 1714, or the like, flows to the system bus 1716 through this digital I/F unit 1711 and the I/O control unit 1708. An image processing unit 1709 performs correction/modification/editing of input and output image data. An image rotation unit 1710 performs a rotation of the image data. An image compression/decompression unit 1712 performs compression/decompression processing for JPEG (multi-valued image data), JBIG/MMR/MR/MH (binary image data). An image density conversion unit 1713 performs resolution transformation for image data for output.

By the control program executed by the CPU 1707, the CPU 1707 reads out operating information such as operation logs and counter values within the storage apparatus 1706, and failure information, and transmits these as status information of the device to a monitoring server via the Network I/F 1702.

<Example Configuration of Device Storage Unit>

FIG. 18 is a figure showing memory space for programs and data that is stored in a non-volatile manner in the storage apparatus 1706 or the ROM 1704 in FIG. 17. Note that FIG. 18 only shows programs or data that are deeply related to the present embodiment, and other items are omitted.

A system program 1801 is program for performing basic control of an apparatus such as an OS or the like. A device management program 1802 is a program for controlling device management. A message transmission/reception program 1803 indicates a program that receives a setting instruction, or the like, from the management system 106, and controls transmission/reception for transmitting device status information and command requests to the management system 106.

A received command analysis program 1804 represents a program for analyzing a command that is included in the communication received from the management system 106, and determining what to perform. In a case in which a command received by the received command analysis program 1804 is a scheduling information setting, it is determined, using a schedule analysis program 1805, which type of data is to be transmitted, according to what schedule it is to be transmitted to the management system 106, or if it is not to be transmitted.

Processing programs 1806 is a generic term for processing programs 1807-1810 and 1824 that are executed in accordance with the result of analysis by the schedule analysis program 1805. For example, in the case that an event occurs on the device, an event information transmission processing program 1807 determines at what timing event data should be transmitted to the management system 106, and confirms an analysis result and performs event information transmission processing according to the analysis result. Also, a schedule transmission program 1808 transmits schedule data. A counter information transmission processing program 1809 transmits counter information. A schedule setting modification processing program 1810 modifies schedule settings. A condition data modification processing program 1824 is a program for modifying condition data that is a condition for transmitting sensor data to the management system 106.

A device ID 1811 represents a device ID that can identify a device within the management system 106. Also, a device status DB 1812 that stores device statuses is managed within a storage apparatus. Device firmware, device type, device basic information 1813, event information such as an error 1814, an alarm 1815, or a jam 1816 that has occurred up until this point, as well as a part level of consumption 1817 or the like are stored in the device status DB 1812. Also, a counter data DB 1818 represents a database for counter data of a device, and in this a charge counter 1819 and a function counter 1820 are managed.

The event monitoring program 1822 is a program that is executed on the device at constant intervals. The event monitoring program 1822 monitors whether sensor data that should be uploaded to the management system 106 does not exist by monitoring the device status DB 1812, and using information managed on a later described condition data DB 1829 and a calculation logic DB 1830. An upload unit 1823 uploads sensor data that should be uploaded that is specified by the event monitoring program 1822 to the management system 106.

A sensor data DB 1825 is a data storage area that maintains an instantaneous value for the various sensor data as a snapshot. A detailed explanation is given in FIG. 20 concerning sensor data that is managed by the sensor data DB 1825. According to this embodiment, temperature sensor information 1826, the vibration sensor information 1827 and pressure sensor information 1828 are stored in the sensor data DB 1825. Note, according to this embodiment, the sensor information type is not limited.

A condition data DB 1829 is a condition data database where condition data for specifying sensor data that should be uploaded is stored. With regards to the condition data DB 1829, a detailed explanation is given with reference to FIG. 10. Condition data is stored in the condition data DB 1829 in order to make possible specifying of condition data that is received from the management system 106 at step S215 in FIG. 2A and step S227 in FIG. 2B. For example, the received condition data may be stored by itself.

A calculation logic DB 1830 is a database that has calculation logic stored. With regards to the calculation logic, a more detailed explanation is given with reference to FIG. 11A to FIG. 11C. An "absolute time" logic 1831, a "print_count" logic 1832, or a "revolution_count" logic 1833 may perform calculation of a date and time or in other words time information based on each independent calculation logic. Programs or the like for realizing the calculation logic are stored beforehand in the calculation logic DB 1830. Also these can be updated from the management system 106.

A program loading area 1834 is a storage region that is loaded for the CPU 1707 to execute the programs shown in FIG. 17.

Note, there are cases in which functional modules that are realized by executing the programs shown in FIG. 18 are indicated in this embodiment by "the program name"+ "unit". For example, the functional module realized by executing the event monitoring program 1822 using the CPU 1707 is an event monitoring unit. For the event monitoring unit, the same reference numeral as the event monitoring program 1822 is attached, and it is referred to as the event monitoring unit 1822.

<Example of Device Operation for the Present Embodiment>

Figure 19:
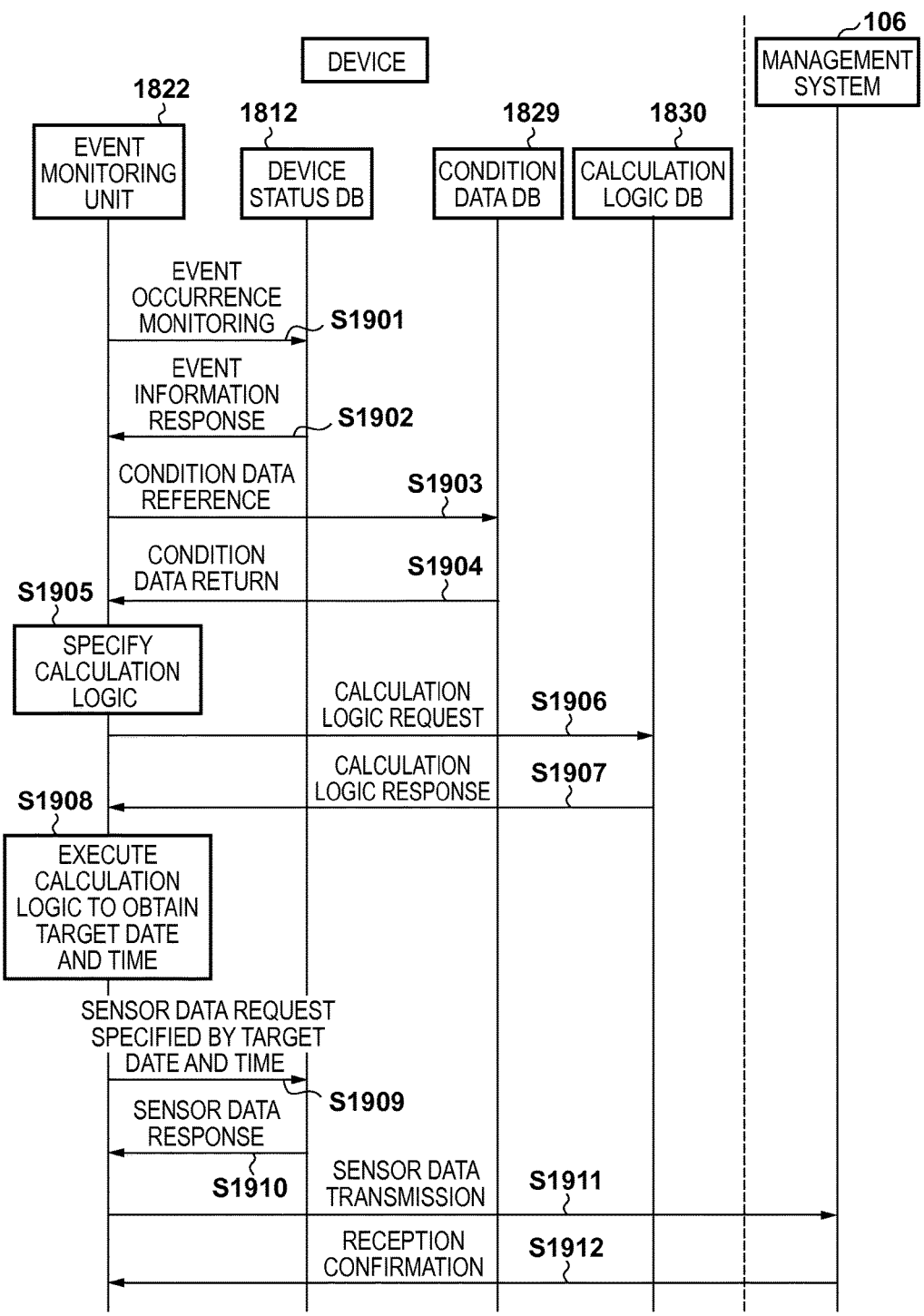
FIG. 19 is a sequence diagram in which sensor data is uploaded to the management system 106 from a device according to the present embodiment.

FIG. 19 shows a part of an example of a communication sequence between a monitoring target network device and the management system 106, according to the embodiment. More specifically, it is a flow for monitoring for the existence of sensor data which should be uploaded to the management system 106 by the event monitoring unit 1822 of the device after the electric power supply of the device is activated.

In step S1901, monitoring of upload target sensor data is initiated by the event monitoring unit 1822 of the device. The event monitoring unit 1822 references the device status DB 1812, and if a new event occurs, it specifies the sensor data of the upload target by referencing the condition data relating to the event in the condition data DB 1829. In accordance with the occurrence of an event, the device status DB 1812 is updated in conjunction with for example a notification to the management system of the event. Therefore, the event monitoring unit 1822 does not monitor the occurrence of an event itself, but rather monitors the updating of the event information in the device status DB 1812. However, configuration may be taken such that a real-time monitoring of the occurrence of an event is performed.

In step S1902, the event monitoring unit 1822 of the device receives event information from the device status DB 1812.

In step S1903 and step S1904, the event monitoring unit 1822 of the device receives condition data based on the event information received from the condition data DB 1829 in step S1902. At this time, the condition data is specified and obtained based on the event ID of the event that occurred. In a case where a plurality of condition data items correspond to one event ID, all of the corresponding condition data is obtained. For example three condition data items are associated with the event ID JAM-CODE-001 in the condition data shown in FIG. 10. In such a case, all of these three condition data items are obtained.

In step S1905, the event monitoring unit 1822 of the device specifies the calculation logic based on the condition data obtained in step S1904. The calculation logic ID is included in the condition data, and it is illustrated specified calculation logic.

In step S1906 and step S1907, the event monitoring unit 1822 of the device obtains the calculation logic specified in step S1905 from the calculation logic DB 1830. The calculation logic is obtained based on the calculation logic ID corresponding to the condition data. In a case where there is a plurality of condition data, all corresponding calculation logic is obtained. The explanation of detailed processing of the calculation logic will be explained later using FIG. 11A to FIG. 11C. Note, if the calculation logic is for example a program, the obtained calculation logic is loaded into the RAM in an executable format.

In step S1908, the event monitoring unit 1822 of the device calculates a target date and time for specifying the upload target sensor data using the condition data and the calculation logic obtained in step S1907. In a case where there is a plurality of condition data, a plurality of target date and time is calculated. Note, the term "sensor data" here is not real-time data, but a snapshot obtained in the past and saved in association with an obtained date and time.

In step S1909, the event monitoring unit 1822 of the device specifies the sensor data based on the target date and time specified in step S1908. The sensor data is saved in the device status DB 1812 as a snapshot at every fixed period, and the sensor data which is closest to the target date and time specified in step S1908 is specified. Also, in the present embodiment, a configuration where all of the sensor data is stored as one table in the device status DB 1812 is taken, but it does not matter if a region for storing the sensor data is distributed in the device status DB 1812. In such a case, distributed sensor data is collected, and is specified as an upload target.

In step S1911, the event monitoring unit 1822 of the device uploads the sensor data specified in step S1910 to the management system 106.

In step S1912, the event monitoring unit 1822 of the device receives a notification that the upload of the sensor data has been completed from the management system 106.

Note, the event monitoring unit 1822 of the device repeats the processing from step S1901 to step S1912 every fixed period.

FIG. 10 indicates an example of condition data 1000 managed by the condition data DB 1829. It is at least a portion of the condition data 922 that is stored in the model-dependent device master DB, and it has the same structure. Event ID 1001 is an ID for uniquely identifying an event in the device, such as an error, an alert, and a jam. Calculation logic ID 1002 is an ID for uniquely identifying logic for calculating the target date and time for specifying the sensor data which should be uploaded. The absolute value 1003 is a value functioning as an input for the calculation logic. For example, it represents that regarding the condition data whose event ID is "JAM-CODE-001" and whose calculation logic ID is "absolute time", a condition is for specifying sensor data 600, 1200, 1800, 3600 and 86400 seconds before "JAM-CODE-001" occurs, each time using the "absolute time" calculation logic.

FIG. 20 indicates an example of sensor data 2000 managed by the sensor data DB 1825. A snapshot date and time 2001 represents a date and time when an instantaneous value of the sensor data is obtained. Data 2002 to 2009 is sensor data of each sensor. T_SENSOR_01, T_SENSOR_02, and T_SENSOR_03 indicate the temperature sensor information 1826. V_SENSOR_01 and V_SENSOR_02 indicate the vibration sensor information 1827. P_SENSOR_01 and P_SENSOR_02 indicate the pressure sensor information 1828. FIG. 20 is an example where 8 sensors are installed in the device, but actually, more precise monitoring of the device status can be done by installing more sensors in the device. Also, it is possible to set more types of sensors and to manage these in the sensor data DB 1825.

Figure 11C:
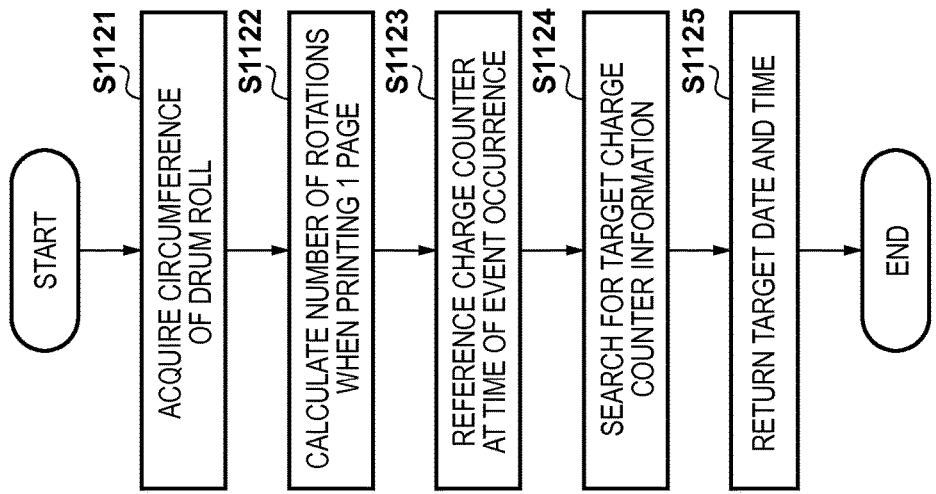
FIG. 11A, FIG. 11B, and FIG. 11C are views for illustrating processing flows of calculation logic according to the present embodiment.
Figure 11B:
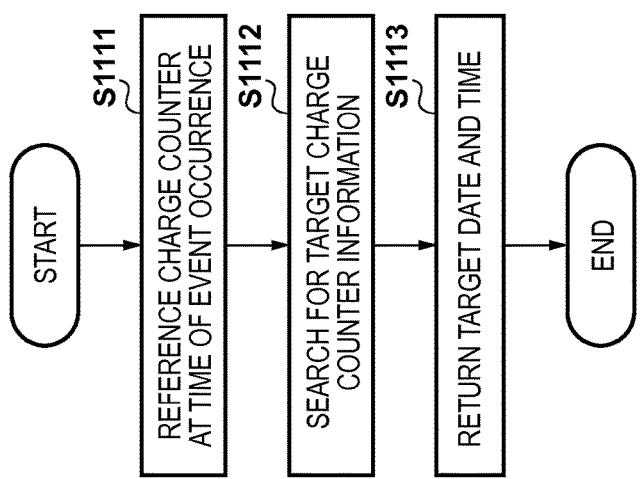
Figure 11A:
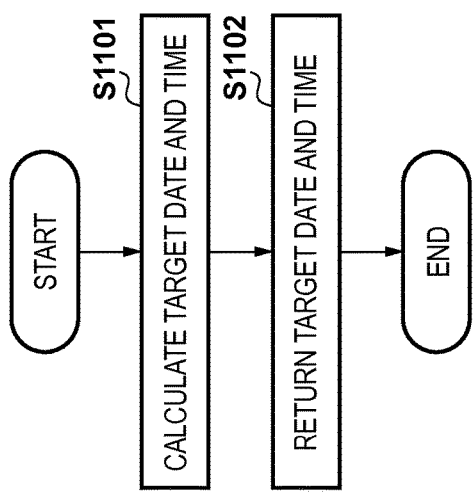

FIG. 11A-FIG. 11C indicate examples of calculation logic for calculating the target date and time required for specifying the sensor data which should be uploaded. This is at least a portion of the calculation logic 923 stored in the model-dependent device master DB. The calculation logic is a function, a library, or an execution module executed by the event monitoring unit 1822. The calculation logic is registered beforehand upon shipping of the device, and it is possible to add calculation logic as necessary at a timing such as upon a firmware update. The target date and time calculated by the calculation logic is used to specify the sensor data which should be uploaded. Each calculation logic returns a "target date and time" having received a "reference date and time", which is a time when an event occurs, and an "absolute value". In this embodiment, the above described values are defined as follows:

T="reference date and time",
P="the target date and time", and
A="the absolute value".

FIG. 11A is calculation logic for a case where the calculation logic ID is "absolute time". In step S1101, P is calculated using following calculation equation:

$$P=T-A$$

In step S1102, P (the target date and time) calculated in step S1101 is returned. As described above, in a case where the logic ID is for "absolute time", it is calculation logic for simply tracing back a time. For example, if the event JAM-CODE-0001 in FIG. 10 occurs, the target date and time P is calculated using the calculation logic "absolute time". In such a case, because 600, 1200, 1800, 3600, and 86400 are provided for A, if the units of A is assumed to be seconds, the target date and time is 10 minutes, 20 minutes, 30 minutes, 1 hour, and 24 hours before the event occurrence date and time. Accordingly, the snapshots of the date and time are transmitted to the management system 106.

FIG. 11B is calculation logic in a case where the logic ID is "print_count". In a case where the logic ID is "print_count", the date and time when the printing was executed A sheets before T is P. In step S1111, the charge counter at the event occurrence is obtained with reference to the device counter data DB 1818. Here, the number of the charge counter at the event occurrence, in other words the total amount of the number of sheets to be printed can be obtained. The specified number of sheets to be printed is total_p. In step S1112, the target charge counter information is searched with reference to the device counter data DB 1818. Here, the target charge counter information is the charge counter information for when total_p—A sheets are printed. The charge counter information is stored in association with the time. In step S1113, the occurrence date and time of the target charge counter information specified in step S1112 is returned as P. As described above, in a case where the logic ID is for "print_count", the sensor data is specified based on the number of times printing is performed. For example, if the event JAM-CODE-0001 in FIG. 10 occurs, the target date and time P is calculated using the calculation logic "print_count". In such a case, 100, 200, 500, 1000, 5000, and 10000 is provided for A, so the target date and time is the date and time at a point in time when each number of sheets is printed prior to the event occurrence date and time. The snapshots of the date and time are transmitted to the management system 106. However, in a case where the same date and time as the other the calculation logic for identical events is obtained, the date and time may be omitted from the target date and time.

FIG. 11C is calculation logic in a case where the calculation logic ID is for 'revolution_count'. In a case where the logic ID is for "revolution_count", the date and time when a number of rotations of a drum roll is A rotations prior to a point in time of the event occurrence is the target date and time. The drum roll is a photoconductive element or a photosensitive drum in, for example, an electrophotographic device, and it is consumed in accordance with a usage amount.

In step S1121, a circumference of the drum roll is obtained. This can be obtained by referencing part information in the device basic information 1815. Here, the circumference of the drum roll is C.

In step S1122, a number of rotations when 1 page is printed is obtained. In order to print 1 page, if the length of longer side of 1 page is Y, Y/C rotations are required.

In step S1123, a charge counter at the event occurrence is obtained with reference to the device counter data DB 1818. The number of the charge counter at the event occurrence, in other words the total number of sheets printed can be obtained. Here, the specified number of sheets printed is total_p. In other words, the number of rotations of the photosensitive drum is converted to the number of sheets.

In step S1124, the target charge counter information is searched with reference to the device counter data DB 1818. Here, the target charge counter information is charge counter information for a point in time when p sheets are printed, where p satisfies A=(total_p−p)×Y/C.

In step S1125, the occurrence date and time of the target charge counter information specified in step S1124 is returned as P. Note that in this embodiment, calculation logic for a case where a number of drum rotations is not stored in the device is indicated, but with regards to the device where the number of drum rotations is stored in association with the date and time, simply the date and time when the number of drum rotations is A may be returned as P.

For example, if the event JAM-CODE-0001 in FIG. 10 occurs, the target date and time P is calculated using the calculation logic "revolution_count". In such a case, 100, 200, 500, 1000, 5000, and 10000 is provided for A, so the target date and time is the date and time at a point in time when the photosensitive drum is rotated the respective number of rotations before the event occurrence date and time. The snapshots of the date and time are transmitted to the management system 106.

In this embodiment, 3 examples are given for calculation logic. According to these 3 examples, 3 causal relationships: an elapsed time and an event; a number of sheets to be printed and an event; and a number of drum rotations and an event can be analyzed. However, the calculation logic is not limited to this. For example, when an event occurs, a number of times another particular event occurred previously is set as an absolute value A, and the date and time when the particular event occurred A times previously can be made to be the target date and time. With this, a causal relationship between events can be analyzed.

As described above, the sensor data can be caused to be uploaded to the management system 106 under a flexible condition by combining the condition data indicated in FIG. 10 and calculation logic explained in FIG. 11A to FIG. 11C. In the management system 106, a relationship between sensor data uploaded from the device and an event can be specified by for example regression analysis. Based on the causal relationship, the management system 106 can predict an event which will occur based on the device status obtained by the schedule type communication processing. Note, the sensor data collected from the device can be referred to as supervised data or device data.

As described above, in the present embodiment, while maintaining high versatility, collection of status data of a device that an analyst requires can be realized efficiently.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-008076, filed Jan. 20, 2014, which is hereby incorporated by reference herein in its entirety.

What is claimed is:

1. A network device communicating with a system for performing analysis of data collected from the network device, the network device comprising:
   a plurality of sensors;
   a sensor data database in which data detected by each of the plurality of sensors is stored;
   a memory storing instructions; and
   a processor which can execute the instructions, causing the network device to:
   (a) obtain, from the system, condition data for specifying supervised data that the system collects,
   (b) update a condition data database of the network device by adding the obtained condition data to the condition data database,
   (c) obtain logic from a logic database of the network device, based on information for specifying logic included in the condition data in the condition data database, wherein the logic database stores different pieces of logic,
   (d) specify, from among data in the sensor data database, data to be transmitted to the system, wherein the specifying includes (1) using the obtained logic to calculate previous timings of data, and (2) specifying data in the sensor data database corresponding to the calculated previous timings, and
   (e) transmit the specified data as supervised data to the system.

2. The network device according to claim 1, wherein the specified data corresponds to time information specified by the logic.

3. The network device according to claim 1, wherein the condition data, in accordance with a request from the network device and in accordance with a predetermined schedule, is obtained from the system.

4. The network device according to claim 2, wherein the condition data includes information for specifying an event that occurred on the network device, the information for specifying the logic, and information for indicating a time that is traced back, and
   wherein the time information is specified by tracing back a time specified by the condition data in accordance with logic specified by the condition data, upon the occurrence of an event specified by the condition data.

5. The network device according to claim 1, wherein data detected by each of the plurality of sensors is stored as a snapshot corresponding to time information in the sensor data database.

6. The network device according to claim 2, wherein the logic database manages logics corresponding respectively to different calculation methods for identifying the time information.

7. A method of specifying data in a network device communicating with a system for performing analysis of data collected from the network device, wherein the network device comprises (a) a plurality of sensors, and (b) a sensor data database in which data detected by each of the plurality of sensors is stored, the method comprising:
   obtaining, from the system, condition data for specifying supervised data that the system collects;
   updating a condition data database of the network device by adding the obtained condition data to the condition data database;
   obtaining logic from a logic database of the network device, based on information for specifying logic included in the condition data in the condition data database, wherein the logic database stores different pieces of logic;
   specifying, from among data in the sensor data database, data to be transmitted to the system, wherein the specifying includes (1) using the obtained logic to calculate previous timings of data, and (2) specifying data in the sensor data database corresponding to the calculated previous timings; and
   transmitting the specified data as supervised data to the system.

8. A non-transitory computer-readable medium storing a program therein for causing a computer to perform a method of specifying data in a network device communicating with a system for performing analysis of data collected from the network device, wherein the network device comprises (a) a plurality of sensors, and (b) a sensor data database in which data detected by each of the plurality of sensors is stored, the method comprising:
   obtaining, from the system, condition data for specifying supervised data that the system collects;
   updating a condition data database of the network device by adding the obtained condition data to the condition data database;
   obtaining logic from a logic database of the network device, based on information for specifying logic included in the condition data in the condition data database, wherein the logic database stores different pieces of logic;
   specifying, from among data in the sensor data database, data to be transmitted to the system, wherein the specifying includes (1) using the obtained logic to calculate previous timings of data, and (2) specifying data in the sensor data database corresponding to the calculated previous timings; and
   transmitting the specified data as supervised data to the system.

* * * * *